US006756757B2

(12) United States Patent
Marcinkiewicz et al.

(10) Patent No.: US 6,756,757 B2
(45) Date of Patent: Jun. 29, 2004

(54) CONTROL SYSTEM AND METHOD FOR A ROTATING ELECTROMAGNETIC MACHINE

(75) Inventors: Joseph G. Marcinkiewicz, St. Charles, MO (US); Michael I. Henderson, St. Louis, MO (US)

(73) Assignee: Emerson Electric Company, St. Louis, MO (US)

( * ) Notice: Subject to any disclaimer, the term of this patent is extended or adjusted under 35 U.S.C. 154(b) by 0 days.

(21) Appl. No.: 10/153,414

(22) Filed: May 21, 2002

(65) Prior Publication Data

US 2003/0218444 A1 Nov. 27, 2003

(51) Int. Cl.[7] .................................................. H02P 7/00
(52) U.S. Cl. ........................ 318/432; 318/434; 318/701
(58) Field of Search .................................. 318/700, 701, 318/661, 715, 561, 560, 601, 721, 802, 805, 806, 809, 632, 609, 254, 807, 432, 610, 803, 822, 439, 138; 323/220–354

(56) References Cited

U.S. PATENT DOCUMENTS

| | | | | |
|---|---|---|---|---|
| 4,961,038 A | * | 10/1990 | MacMinn | 318/696 |
| 5,223,775 A | * | 6/1993 | Mongeau | 318/432 |
| 5,488,280 A | | 1/1996 | Langreck | 318/805 |
| 5,569,994 A | | 10/1996 | Taylor et al. | 318/700 |
| 5,834,918 A | * | 11/1998 | Taylor et al. | 318/601 |
| 5,841,262 A | * | 11/1998 | Tang | 318/701 |
| 5,852,355 A | * | 12/1998 | Turner | 318/701 |
| 5,962,999 A | * | 10/1999 | Nakamura et al. | 318/432 |
| 6,002,234 A | | 12/1999 | Ohm et al. | 318/729 |
| 6,005,364 A | | 12/1999 | Acarnley | 318/632 |
| 6,262,550 B1 | | 7/2001 | Kilman et al. | 318/565 |
| 6,304,052 B1 | * | 10/2001 | O'Meara et al. | 318/700 |
| 6,452,357 B1 | * | 9/2002 | Jahkonen | 318/721 |
| 6,498,449 B1 | * | 12/2002 | Chen et al. | 318/434 |
| 6,498,451 B1 | * | 12/2002 | Boules et al. | 318/661 |

FOREIGN PATENT DOCUMENTS

EP          1061640 A      12/2000

OTHER PUBLICATIONS

Tae Kyoon Ha et al, "Simple and high–performance drive of switched reluctance motors for low–cost applications," Industrial Electronics, 1997, ISIE '97, Proceedings of the IEEE International Symposium on Guimaraes, Portugal Jul. 7–11, 1997, New York, NY, Use, IEEE, US, Jul. 7, 1997, pp. 631–636, XP01265098 ISBN 0–7803–3936–3.

(List continued on next page.)

Primary Examiner—Rina Duda
Assistant Examiner—Eduardo Colon Santana
(74) Attorney, Agent, or Firm—Howrey Simon Arnold & White LLP

(57) ABSTRACT

A system and method for controlling a rotating electromagnetic machine. The rotating machine, such as a permanent magnet motor or switched reluctance motor, includes a stator having a plurality of phase windings and a rotor that rotates relative to the stator. A drive is connected to the phase windings for energizing the windings. The control system includes an estimator connectable to the machine for receiving signals representing the phase winding voltage and rotor position. The estimator outputs parameter estimations for an electrical model of the machine based on the received voltage and rotor position. A torque model receives the parameter estimations from the estimator to estimate torque for associated rotor position-phase current combinations of the machine. A controller outputs a control signal to the drive in response to a torque demand and rotor position signals and the torque model. In certain embodiments, a solver uses the torque model to generate energization current profiles according to desired machine behavior, such as smooth torque and/or minimal sensitivity to errors in rotor position measurement.

35 Claims, 3 Drawing Sheets

OTHER PUBLICATIONS

Quo Qingding et al, "Neural network adaptive observer based postion and velocity sensorless control of PMSM," Advanced Motion Control, 1996. AMC '96–MIE. Proceedings., 1996. 4th International Workshop on MIE, Japan Mar. 18–21, 1996, New York, NY, USA, IEEE, US Mar. 18, 1996, pp. 41–46, XP010164178 ISBN: 0–7803–3219–9.

International Search Report for International Application No. PCT/US03/15773, Oct. 6, 2003.

Krause et al, Analysis of Electric Machinery, 1986, Chapter One pp. 1–31.

Quarteroni et al, Numerical Mathematics, 2000, Chapter Sever pp. 281–287.

Wellstead et al, Self–Tuning Systems, 1991, Chapter Three pp. 71–91.

Akhiezer et al, Theory of Linear Operators in Hilbert Space, 1993, pp. 10–17.

Chapman et al, Design and Precise Realization of Optimized Current Waveforms for an 8/6 Switched Reluctance Drive, Jan. 2002.

* cited by examiner

CONTROL SYSTEM AND METHOD FOR A ROTATING ELECTROMAGNETIC MACHINE

BACKGROUND OF THE INVENTION

1. Field of the Invention

The invention relates generally to the control of electromagnetic rotating machines such as permanent magnet, switched reluctance and hybrid machines thereof, and more particularly, to adaptive, smooth torque control of such machines.

2. Description of Related Art

Many electromagnetic machines in general, and electric motors employing permanent magnets in particular, exhibit torque irregularities as the rotor rotates with respect to the stator, the coils of which are typically energized with a sinusoidal waveform. Such irregularities are referred to as "torque ripple." These torque irregularities may be caused by the physical construction of a given machine. For example, they may result from the use of bearings to support the rotor. In addition, because of the electromagnetic characteristics of machines that employ magnets, the rotor tends to prefer certain angular positions with respect to the stator. Torque irregularities resulting from the electromagnetic characteristics of an electromagnetic machine are commonly known as "cogging" irregularities and the resultant non-uniform rotation of the rotor or non-uniform torque output is known as "cogging." Cogging is either current independent or current dependent. The first component is noted when the machine is spun unenergized. The second component is present when current flows—the cogging grows as the magnitude of the stator currents increases.

In rotating electromagnetic machines employing permanent magnets, cogging most often results from the physical construction of the machine. Irregularities due to the magnets can result, for example, from the magnets being incorrectly placed upon or in the rotor, or from some irregularity about how the magnets are energized. Moreover, the utilization of rotors having discrete north and south outer poles results in a circumferential distribution of magnetic flux about the rotor circumference that is not smooth, but choppy. Additionally, the stators commonly used with such machines are formed in such a way that the magnetic fluxes generated by the stator windings provide a flux distribution about the stator circumference that is not smooth. The combination of such rotors and stators, and the accompanying non-smooth flux distributions, produces undesired irregularities in the torque output of such machines. Rotor output non-uniformities may also be produced by back emf harmonics produced in certain machines.

Obtaining smooth torque is further complicated by other factors. For instance, manufacturing variances between motors makes it difficult, if not impossible, to apply a common solution to a group of motors. Such manufacturing variance includes the placing or misplacing of magnets upon the rotor (if surface mounted), variance introduced by the magnetizing process itself and irregularities in the stator coil windings. Other causes of variance include instances when the magnets are damaged or chipped. Further, variations exist even within individual motors. For example, variations typically exist between a motor's phases and over the motor's full mechanical cycle. Moreover, motor behavior changes over time as the motor ages.

The phase windings of certain types of electromagnetic machines are energized at least in part as a function of the instantaneous rotor position. Accordingly, such machines often use a rotor position sensor that provides an output indicating rotor position relative to the stator. A controller uses this information to produce control signals that are used to energize and de-energize the phase windings. Errors in the measurement of the angular position of the rotor also contribute to torque ripple.

For many motor applications a slight non-uniformity in the rotation of the rotor caused by torque irregularities is of little or no consequence. For example, in large motors driving large loads, slight variations in the output torque will not significantly affect the rotor speed and any slight variations in rotor speed will not significantly affect the system being driven by the machine. This assumes that the torque variation as the machine turns is small compared to the load. In other applications, where the rotation of the rotor or the torque output of the motor must be precisely controlled or uniform, such non-uniformity is not acceptable. For example, in servomotors used in electric power steering systems and is in disk drives, the rotational output of the rotor or the torque output of the motor must be smooth and without significant variation.

Prior art approaches to reducing the undesirable consequences of torque irregularities in electromagnetic machines have focused on relatively complex rotor or stator constructions designed to eliminate the physical characteristics of the machines that would otherwise give rise to the irregularities. While the prior art machine construction approaches can result in reduction of torque irregularities, the approaches require the design and construction of complex rotor and stator components, such complex components are typically difficult to design, difficult to manufacturer, and much more costly to produce than are conventionally constructed components. Moreover, many of the physical changes required by such prior art solutions result in a significant reduction in the efficiency or other performance parameters of the resulting machines over that expected of comparable conventional machines. Thus, many of the prior art attempts to reduce torque irregularities do so at the cost of machine performance.

Attempts to reduce torque ripple that focus on motor control schemes, rather than motor construction, have also been undertaken. For example, various learning or iterative schemes, based on either experimental procedures or well known physical relationships concerning motor voltages, currents and angular positions have been attempted. These attempted solutions often make assumptions concerning the behavior of the motor, such as motor flux being described by a linear relationship, or considering the effect of mutual flux insignificant. Still further, prior solutions to torque ripple typically ignore the effect of motor sensitivity to inaccuracies in angular measurement. To increase accuracy in position measurement, the use of sophisticated position sensors has been attempted, but this increases the machine's complexity and cost.

Thus, a need exists for a control system that addresses the shortcomings of the prior art.

SUMMARY OF THE INVENTION

In one aspect of the present invention, a system for controlling a rotating electromagnetic machine is presented. The rotating machine, such as a permanent magnet motor or switched reluctance motor, or some hybrid of the two, includes a stator having a plurality of phase windings and a rotor that rotates relative to the stator. A drive is connected to the phase windings for energizing the windings. The control system includes an estimator connectable to the machine for receiving signals representing the phase winding voltage, current and rotor position. The estimator outputs parameter estimations for an electrical model of the machine based on the received voltage, current and rotor position. The electrical model is a mathematical model that describes electrical behavior of the machine as seen at the motor terminals.

A torque model receives the parameter estimations from the estimator. The torque model is developed via a mathematical transform of the electrical model, and describes torque characteristics of the machine. Using the parameters received from the estimator, the torque model estimates torque for associated rotor position-phase current combinations. A controller has input terminals for receiving a torque demand signal and the rotor position signal. The controller outputs a control signal to the drive in response to the torque demand and rotor position signals and the torque model. In certain embodiments, a solver uses the torque model to generate energization current profiles according to desired machine behavior, such as smooth torque and/or minimal sensitivity to errors in rotor position measurement. It is to be noted in particular that the solver can be so defined that the solution possesses particular properties. It may be desired to deal with only the most significant components of cogging or torque ripple, a result of motor drive cost considerations. Such a solution can be achieved.

Some parameters of the torque model are unobservable via information immediately available from the machine terminals. For example, in machines employing permanent magnets, it is not mathematically obvious how changes in the machine current and voltage, as the rotor spins, indicate or measure the interaction of the machine's magnets with themselves. In accordance with further aspects of the present invention, a method of determining a non-load dependent cogging torque is provided. The rotor is spun unloaded at a predetermined angular velocity and the motor terminal voltage and current are measured. Rotor positions associated with the voltage and current measurements are determined, and a first mathematical model is developed based on the measured voltage and rotor position to describe electrical behavior of the machine. The first mathematical model is mathematically transformed to develop a second mathematical model to describe torque characteristics of the machine. The windings are then energized such that the rotor holds a predetermined position against the cogging torque, and the cogging torque is calculated for the predetermined position via the second mathematical model.

BRIEF DESCRIPTION OF THE DRAWINGS

Other objects and advantages of the invention will become apparent upon reading the following detailed description and upon reference to the drawings in which.

Figure 1:
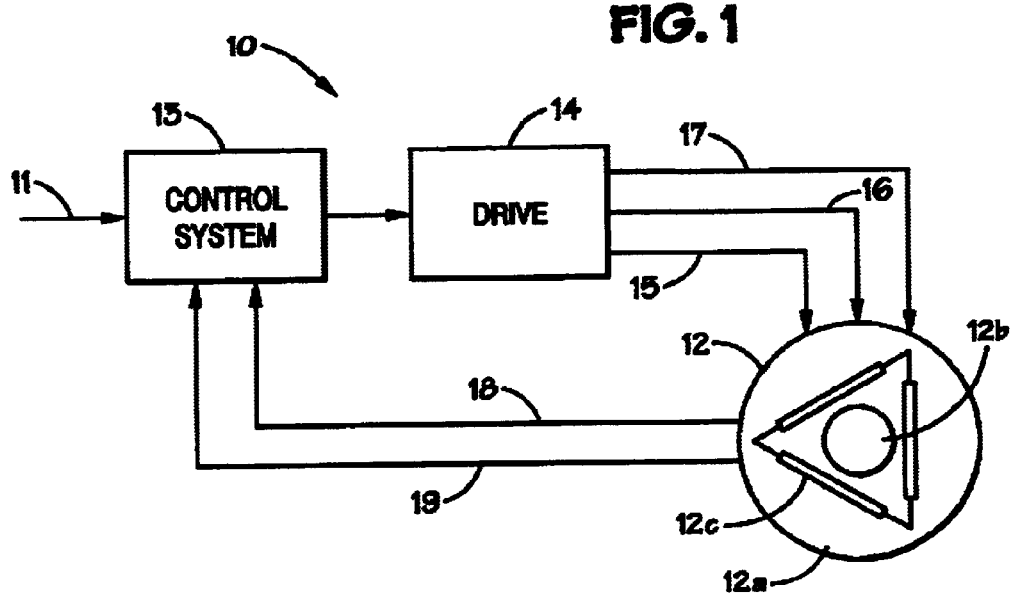
FIG. 1 is a block diagram of an exemplary rotating electromagnetic machine system in accordance with embodiments of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turing to the drawings and, in particular, to FIG. 1, a system 10 constructed according to certain teachings of this disclosure is illustrated. Among other things, the illustrated system 10 actively controls the electric power supplied to an electromagnetic machine such that the negative consequences of torque irregularities that would otherwise be produced by the machine are reduced or eliminated.

The system 10 includes an electromagnetic machine 12 and a drive 14 that provides electric power to the electromagnetic machine 12. The machine 12 shown in FIG. 1 may comprise, for example, a permanent magnet motor, a switched reluctance motor, or a hybrid motor (permanent magnet and switched reluctance combination). The machine 12 is of conventional construction that includes a rotating component (a rotor 12a) and a stationary component (a stator 12b). Wound about the stator are a number of energizable phase windings 12c which may be energized through the application of electric power to motor terminals 15, 16, 17.

The drive 14 is coupled to provide electric power to terminals 15, 16 and 17 of the machine 12. The drive 14 receives control inputs from a control system 13, which is coupled to receive feedback from the machine 12 in terms of rotor position information 18 and energization feedback 19. Other feedback information may be provided to the controller 13. While the drive 14 is illustrated in exemplary form as providing three power terminals to the machine 12, it should be understood that more or fewer power terminals may be provided to accommodate motors or machines with greater than three phases, less than three phases or if various types of inverters (e.g., with neutral connections) are used.

The energization feedback 19 provides an indication of the operational characteristics of the machine 12 and may, for example, include feedback concerning the currents flowing in the stator windings and/or the voltages at the terminals 15, 16 and 17. The position and energization parameters may be detected through conventional detectors such as standard rotor position detectors and standard current/voltage sensors. Alternative embodiments are envisioned in which the rotor position and feedback parameters are not detected directly but are calculated or estimated through known techniques. For example, embodiments are envisioned where only the terminal voltages are known or sensed along with the currents flowing through the stator windings of the machine 12 and the sensed current and voltage values are used to derive rotor position information.

The control system 13 also receives input command signals 11 that correspond to a desired output parameter of machine 12 such as rotor speed, output torque, etc. As described in more detail below, the drive 14 controls the application of electric power to machine 12 in response to the control system 13 in such a manner that the difference between the input command signal 11 and the corresponding output of the machine 12 is minimized. In certain embodiments, the control system 13 also actively controls application of power to the machine 12 as a function of rotor position in such a manner to achieve a desired behavior of the machine 12 meeting one or more criteria in categories including, for example, torque ripple, cogging torque, angular sensitivity, harmonic content, etc. The use of the control system 13 to actively achieve desired machine behavior, as opposed to attempting to achieve such behavior through complex rotor or stator constructions, results in a better performing system in that, for example, conventional, low cost machines and machine construction techniques may be used.

Figure 2:
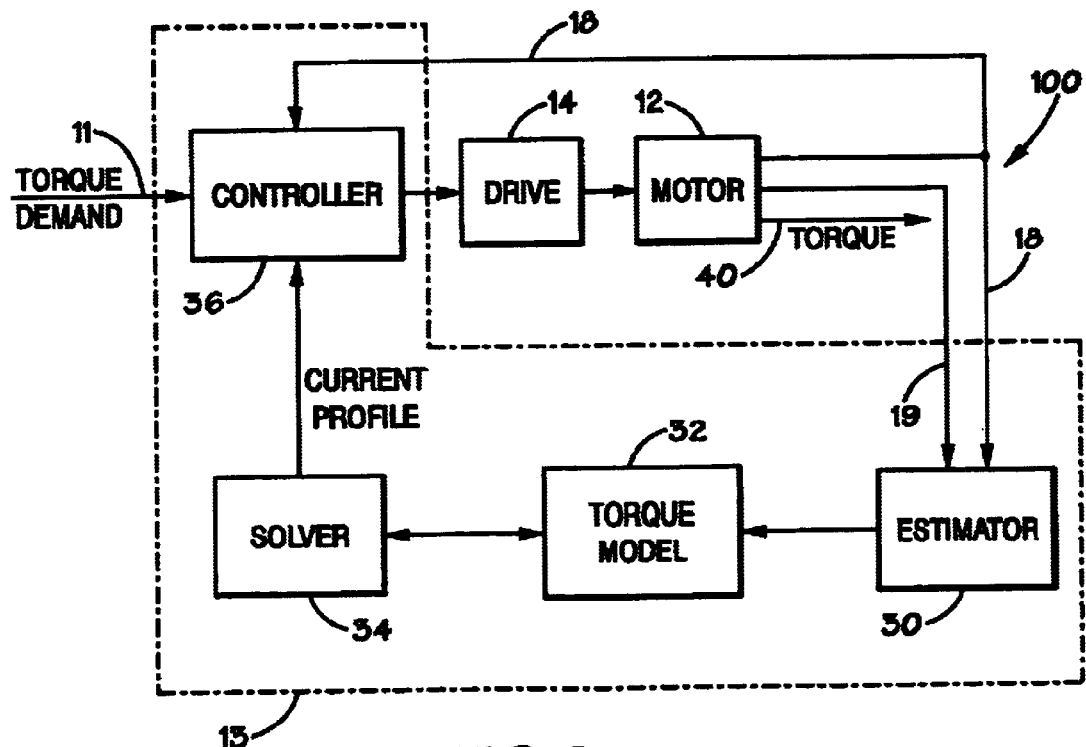
FIG. 2 is a block diagram illustrating an electromagnetic machine control system in accordance with embodiments of the present invention.

An electromagnetic machine system 100 in accordance with an exemplary embodiment of the present invention is shown in FIG. 2. The machine system 100 includes a control system 13, which may be implemented by an appropriately programmed digital controller, such as a digital signal processor (DSP), microcontroller or microprocessor.

The control system 13 includes an input terminal 11 that receives, for example, a signal representing the torque demanded of the motor 12. Torque is a function of current and angle; hence, for any particular rotor angle there is a set of appropriate currents that will produce the desired torque. Based on the rotor angle and the required torque, appropriate current values are sent to the drive 14, which in turn provides the necessary voltage to the motor 12 to meet the current demand.

Rotor position feedback 18 and energization feedback 19, such as the motor terminal voltage and current, are provided to an estimator 30. In accordance with mathematical "good practice," the voltage and current values may be normalized—the measured values are divided by the maximum expected value. The estimator 30 calculates motor parameters such as angular speed and the time derivatives of the phase currents. These values are used to derive and update a first mathematical model that describes the electrical behavior of the motor 12. The structure of the electrical model is such that it can accurately represent electrical machine characteristics such as resistance, back electromagnetic force ("BEMF"), self and mutual inductance, cogging, etc., depending on the type of machine 12 employed.

The parameters calculated by the estimator 30 are passed to a torque model 32 of the motor 12. The torque model 32 is developed by mathematically transforming the electrical model in an appropriate manner, dictated by the electromagnetic physics of the motor 12, into a second model that describes the torque characteristics of the machine 12. Since the electrical model coefficients flow naturally into the torque model 32, by constructing an accurate electrical model of the motor 12, the torque characteristics of the motor 12 are also known. For example, the torque model may describe the torque produced for any combination of phase current and rotor position in the normal operating envelope of the machine. Thus, using the values calculated by the estimator 30, an estimate of motor torque can be calculated for any current-angle combination.

The torque model 32 is interrogated by a solver 34, which calculates the required currents, or solution curves, according to some desired motor behavior and the known behavior of the motor 12 (as regards current and angle). Thus, the controller 36 provides the appropriate current for a given rotor angular position to achieve the desired output torque 40 or other output parameter, and further, to achieve the output parameter in accordance with the desired machine behavior. For example, the desired machine behavior may include the operating characteristics of the motor 12 meeting one or more criteria in categories including cogging torque, torque ripple, angular sensitivity of the solution to angular error and harmonic content of the solution curves. In the particular system 100 shown in FIG. 2, the solver 34 output is stored explicitly as a lookup table accessible by the controller 36. The torque demand 11 and rotor angle is applied to the lookup table to determine the appropriate phase current value to be applied to the phase windings via the driver 14. In other embodiments, the output of the solver 34 is in an analytic form, derived by fitting a function to the calculated numerical values.

Since the electrical model used by the estimator 30 is algebraic in nature, the estimator 30 can be allowed to run for some time period operating upon not necessarily sequential data before a new set of parameter estimates are released in to the torque model 32. At this point the solver 34 can then recalculate the necessary lookup tables 36. Once fully calculated, the new lookup tables can then replace those tables currently in use. Many of these operations can be background tasked; that is, they can occur as and when computational resources are available. This is one of the advantages of an algebraic motor model—it is not intricately wrapped up in the time variable.

Torque can be estimated via coenergy or field energy, though calculating torque via coenergy results in simpler expressions. Thus, the estimate of output torque 40 can be calculated using only feedback available from the machine terminals—such as the terminal voltage and current and the rotor position—to estimate the parameters of resistance and flux linkage. The following disclosure is generally provided in terms of a three phase hybrid motor, though the model form can be generalized into different types of rotating machines having any number of phases by one skilled in the art having the benefit of this disclosure.

It is common in many applications to utilize what is known as a balanced three phase feed. In such systems, when a three-phase motor is used, the sum of the three phase currents will equal zero. Hence, the $\alpha\beta$-Frame of Reference (FoR) can be used. If balanced feed is not used, it is necessary to use the abc-FoR. The $\alpha\beta$-FoR is considered first.

The electrical model may have the form of a product of polynomial expressions in current and angle. Typically, those for angle will involve trigonometric functions. The current polynomials may also be orthogonal and may be one of any number of suitable polynomial types. For more complex machines, an orthogonal model form may be appropriate. With the first model structure disclosed herein, it is assumed that flux linkage models are expressions that are products of polynomial terms involving phase currents and trigonometric polynomials of mechanical angle. Models using orthogonal functions are discussed further later in this specification. Generally, the following nomenclature is used in this disclosure:

φ is the phase index, ranges over defined set of numbers {1,2,3, . . . } or equivalent letters {a,b,c, . . . } a,b,c are phase names, equivalent to 1,2,3 when numerically referenced

α,β,0 are αβ Frame of Reference (FoR) labels $\lambda_\phi$ is the phase φ flux linkage p,P . . . q,Q . . . r,R . . . n,N are summation indexes and maximum index values sin( ), cos( ) are trigonometric functions $g_{\phi pqrn}$, $h_{\phi pqrn}$ are model parameters $i_\alpha, i_\beta, i_C$ are variables representing αβ frame of reference currents $I_\alpha, I_\beta$ are maximum values of αβ-frame of reference currents encountered in the coenergy integral $i_a, i_b, i_c$ are variables representing abc-frame of reference currents $I_a, I_b, I_c$ are maximum values of abc-FoR currents encountered in the coenergy integral $i_f$ is the current flow associated with the fictious rotor circuit modelling the presence of a magnet $v_\phi$ is the phase φ voltage $R_{\phi\alpha}, R_{\phi\beta}, R_{\phi\alpha\beta}$ are resistance values associated with phase φ

$$\frac{d}{dy}x$$

is the differential of x with respect to y

θ is the rotor angle

ω is the rotor angular velocity t is time t $\omega_c$ is coenergy dx is x infintesimal ∫ f(x) dx is the integral of f(x) with respect to x $$\frac{\partial}{\partial x}f(x, y, \ldots)$$

is the partial derivative of function f(.) with respect to x $D_1, \ldots, D_6$ are components of the coenergy integral, along defined path T is motor or true torque $o(x^n)$ is the remainder associated with n'th order and higher terms of the Jacobian matrix $J_{ij}$ is the ij'th entry of the Jacobian $F_i(x_1, \ldots, x_M)$ is the i'th function of variables $x_1, \ldots, x_M$ δx is delta x $\delta x_{new}$ is the new value of delta x, or change in x $x_{new}, x_{old}$ are new and old values of x calculated during Newton iterative process $T_{tv}$ is estimated torque, directly from the terminal variables $T_{cog}$ is torque which cannot be calculated directly using terminal variables $S_a$ is solution sensitivity $$I = \begin{pmatrix} i_\alpha(\theta(1)) \\ i_\alpha(\theta(2)) \\ \ldots \\ i_\alpha(\theta(N)) \\ i_\beta(\theta(1)) \\ i_\beta(\theta(2)) \\ \ldots \\ i_\beta(\theta(N)) \end{pmatrix}$$

is the vector of αβ frame of reference current values across the set of discrete angle values I(n+1),I(n) are the (n+1)'th and n'th iterated current vectors ΔI(n) is the calculated change in current vector at n'th interval $\phi_{Tk}$=(0 . . . 0 T(θ(k),$i_\alpha$(k),$i_\beta$(k)) 0 . . . 0) is the k'th torque vector $\phi_{Sk}$=(0 . . . 0 S(θ(k),$i_\alpha$(k),$i_\beta$(k)) 0 . . . 0) is the k'th sensitivity vector $$A = \begin{pmatrix} \phi_{T1} \\ \ldots \\ \phi_{TN} \end{pmatrix}$$

are stacked torque vectors $$B = \begin{pmatrix} \phi_{S1} \\ \ldots \\ \phi_{SN} \end{pmatrix}$$

are stacked current vectors

Assuming that the model structure for each machine phase (φ) is identical, the general form of the flux model using the αβ-FoR is:

$$\lambda_\phi = \sum_{p=0}^{P} i_\alpha^p \cdot \sum_{q=0}^{Q} i_\beta^q \cdot \sum_{r=0}^{R} i_f^r \cdot \sum_{n=0}^{N} (g_{\phi pqm} \cdot \sin(n \cdot \theta) + h_{\phi pqm} \cdot \cos(n \cdot \theta)) \quad (1)$$

Such a model allows for a non-linear relationship between phase current and flux as well as mutual effects between any two or more phases. As noted above, for the purposes of the present disclosure it is assumed that model structure is invariant with respect to phase, although this need not be so. Contiguous powers of polynomial current and angle harmonic need not be used, as is the case in Equation (1). For example, consider the following:

$$\lambda_\phi = \sum_{p=p_1}^{p_S} i_\alpha^p \cdot \sum_{q=q_1}^{q_T} i_\beta^q \cdot \sum_{r=r_1}^{r_U} i_f^r \cdot \sum_{n=n_1}^{n_V} (g_{\phi pqm} \cdot \sin(n \cdot \theta) + h_{\phi pqm} \cdot \cos(n \cdot \theta)) \quad (2)$$

where the indexing sets:

p=($p_1, p_2, \ldots, p_S$.) r=($r_1, r_2, \ldots, r_U$.)
q=($q_1, p_2, \ldots, q_T$.) n=($n_1, n_2, \ldots, n_V$.)

need not contain contiguous integers. In fact, most practical applications will have this form.

Relatively simple models of the form presented in Equation (2) that are sufficiently accurate can be obtained. Model structure can be allowed to vary between phases if so desired. This variation upon defining model structure has a significant impact upon the computational complexity of the associated algorithms. Some model components will be present as a result of manufacturing variance and would not be suggested by a theoretical consideration of the motor design. Further, model complexity can vary greatly between motors of different design. For example, a permanent magnet motor design with the express intent of reducing cogging, typically through the use of skew, may only require a very simple model to accurately predict torque. It is generally desirable to avoid models that are over or under determined.

The abc-FoR currents can be transformed into αβ-FoR currents using the following transform:

$$\begin{pmatrix} i_\alpha \\ i_\beta \\ i_0 \end{pmatrix} = \begin{pmatrix} 1 & 0 & 1 \\ \frac{-1}{2} & \frac{-1}{2} \cdot \sqrt{3} & 1 \\ \frac{-1}{2} & \frac{1}{2} \cdot \sqrt{3} & 1 \end{pmatrix} \cdot \begin{pmatrix} i_a \\ i_b \\ i_c \end{pmatrix} \quad (3)$$

Under the balanced feed assumption, the third phase current is zero. It is known that phase voltage ($v_\phi$) is defined by $$v_\phi = i_\phi \cdot R_\phi + \frac{d}{dt}\lambda_\phi \quad (4)$$

where $R_\phi$ is the phase resistance. Thus, using the αβ-FoR:

$$v_\phi = R_\phi + i_\alpha \cdot R_{\phi\alpha} + i_\beta \cdot R_{\phi\beta} + i_\alpha \cdot i_\beta \cdot R_{\phi\alpha\beta} + \frac{d}{dt}\lambda_\phi \quad (5)$$

It should be noted that there are more resistance terms in Equation (5) then is necessary from the perspective of how electric circuits operate. Such additional terms allow for the presence of test data offsets and the like to be directly compensated for; otherwise the estimator will set redundant terms to zero.

It is also known that angular velocity (ω) is defined by:

$$\omega = \frac{d}{dt}\theta \quad (6)$$

From Equations (1) and (4):

$$\frac{d}{dt}\lambda_\phi = \sum_{p=1}^{P}\left(p i_\alpha^{p-1} \cdot \frac{d}{dt} i_\alpha\right) \cdot \quad (7)$$

$$\sum_{q=0}^{Q} i_\beta^q \cdot \sum_{r=0}^{R} i_f^r \cdot \sum_{n=0}^{N}(g_{\phi pqrn} \cdot \sin(n \cdot \theta) + h_{\phi pqrn} \cdot \cos(n \cdot \theta)) \cdots +$$

$$\sum_{p=0}^{P} i_\alpha^p \cdot \sum_{q=1}^{Q}\left(q i_\beta^{q-1} \cdot \frac{d}{dt} i_\beta\right) \cdot$$

$$\sum_{r=0}^{R} i_f^r \cdot \sum_{n=0}^{N}(g_{\phi pqrn} \cdot \sin(n \cdot \theta) + h_{\phi pqrn} \cdot \cos(n \cdot \theta)) \cdots +$$

$$\sum_{p=0}^{P} i_\alpha^p \cdot \sum_{q=0}^{Q} i_\beta^q \cdot \sum_{r=1}^{R}\left(r i_f^{r-1} \cdot \frac{d}{dt} i_f\right) \cdot$$

$$\sum_{n=0}^{N}(g_{\phi pqrn} \cdot \sin(n \cdot \theta) + h_{\phi pqrn} \cdot \cos(n \cdot \theta)) \cdots +$$

$$\sum_{p=0}^{P} i_\alpha^p \cdot \sum_{q=0}^{Q} i_\beta^q \cdot \sum_{r=0}^{R} i_f^r \cdot \sum_{n=1}^{N} \omega \cdot n \cdot (g_{\phi pqrn} \cdot \cos(n \cdot \theta) - h_{\phi pqrn} \cdot \sin(n \cdot \theta))$$

The imaginary rotor current ($i_f$) is nominally constant and its time derivative is zero. Hence, from Equations (5) and (7):

$$v_\phi = R_\phi + i_\alpha \cdot R_{\phi\alpha} + i_\beta \cdot R_{\phi\beta} + i_\alpha \cdot i_\beta \cdot R_{\phi\alpha\beta} \cdots + \quad (8)$$

$$\sum_{p=1}^{P}\left(p i_\alpha^{p-1} \cdot \frac{d}{dt} i_\alpha\right) \cdot$$

$$\sum_{q=0}^{Q} i_\beta^q \cdot \sum_{r=0}^{R} i_f^r \cdot \sum_{n=0}^{N}(g_{\phi pqrn} \cdot \sin(n \cdot \theta) + h_{\phi pqrn} \cdot \cos(n \cdot \theta)) \cdots +$$

$$\sum_{p=0}^{P} i_\alpha^p \cdot \sum_{q=1}^{Q}\left(q i_\beta^{q-1} \cdot \frac{d}{dt} i_\beta\right) \cdot$$

$$\sum_{r=0}^{R} i_f^r \cdot \sum_{n=0}^{N}(g_{\phi pqrn} \cdot \sin(n \cdot \theta) + h_{\phi pqrn} \cdot \cos(n \cdot \theta)) \cdots +$$

$$\sum_{p=0}^{P} i_\alpha^p \cdot \sum_{q=0}^{Q} i_\beta^q \cdot \sum_{r=0}^{R} i_f^r \cdot \sum_{n=1}^{N} \omega \cdot n \cdot (g_{\phi pqrn} \cdot \cos(n \cdot \theta) - h_{\phi pqrn} \cdot \sin(n \cdot \theta))$$

In embodiments employing a switched reluctance machine, there is no imaginary rotor current state as there are no rotor magnets with which this state is associated, hence:

$$i_f \equiv 0 \text{ and } \frac{d}{dt} i_f \equiv 0 \quad (9)$$

Therefore, in the case of a switched reluctance machine, indexing variable (r) associated with the imaginary rotor phase may be removed from Equation (8):

$$v_\phi = R_\phi + i_\alpha \cdot R_{\phi\alpha} + i_\beta \cdot R_{\phi\beta} + \quad (10)$$

$$i_\alpha \cdot i_\beta \cdot R_{\phi\alpha\beta} \cdots + \sum_{p=1}^{P}\left(p i_\alpha^{p-1} \cdot \frac{d}{dt} i_\alpha\right) \cdot \sum_{q=0}^{Q} i_\beta^q \cdot$$

$$\sum_{n=0}^{N}(g_{\phi pqn} \cdot \sin(n \cdot \theta) + h_{\phi pqn} \cdot \cos(n \cdot \theta)) \cdots +$$

-continued $$\sum_{p=0}^{P} i_\alpha^p \cdot \sum_{q=1}^{Q} \left( q i_\beta^{q-1} \cdot \frac{d}{dt} i_\beta \right) \cdot$$

$$\sum_{n=0}^{N} (g_{\phi pqn} \cdot \sin(n \cdot \theta) + h_{\phi pqn} \cdot \cos(n \cdot \theta)) \cdots +$$

$$\sum_{p=0}^{P} i_\alpha^p \cdot \sum_{q=0}^{Q} i_\beta^q \cdot \sum_{n=1}^{N} \omega \cdot n \cdot (g_{\phi pqn} \cdot \cos(n \cdot \theta) - h_{\phi pqn} \cdot \sin(n \cdot \theta))$$

It would be a routine undertaking for one skilled in the art having the benefit of this disclosure to apply a similar process of simplification to the specific case of an SR motor, for example.

There are several techniques available for calculating the coefficients in the model given test data. As noted above, the electrical model is algebraic, which allows the use of any of a number of parameter estimation techniques, such as least squares methods or grammian matrix methods. Least squares-based parameter estimators find the model coefficients that minimize the square of the difference between the observed data and the output from the model. Recursive least square parameter estimators are used in particular embodiments of the invention. The recursive least squares parameter estimators are most suitable for actual production systems. They operate in such a manner that they can produce an improved estimate with each new sample of data. That is, they are not restricted in their operation to complete sets of test data.

A further refinement of the recursive least squares parameter estimation technique involves the use of a "forgetting factor," which operates in the following manner. As more and more data is captured, the effect that the old data has upon the calculation of the new data is reduced. In this way, only the most recent data will have a significant effect in the parameter estimation process. This forgetting factor operates over any appropriate time interval—for example, minutes, hours or days—depending on design considerations. Many of the variables considered do not vary significantly over time. Some, however, such as phase resistance, vary over time and with respect to other factors such as the machine temperature. This added refinement allows the control system to be tuned to any particular machine, and also allows adaptation to changes in that machine. This typically occurs as the machine ages.

Various data collection schemes may be used for parameter estimation. For example, one data collection technique requires constant phase current, which usually only occurs in controlled data collection situations. Another involves varying current, typical of practical applications.

In the constant phase current data collection scheme, $$\frac{d}{dt} i_\alpha = \frac{d}{dt} i_\beta = 0$$

Under these conditions, Equation (8) reduces to:

$$v_\phi = R_\phi + i_\alpha \cdot R_{\phi\alpha} + i_\beta \cdot R_{\phi\beta} + i_\alpha \cdot i_\beta \cdot R_{\phi\alpha\beta} \cdots + \quad (11)$$

$$\sum_{p=0}^{P} i_\alpha^p \cdot$$

$$\sum_{q=0}^{Q} i_\beta^q \cdot \sum_{r=0}^{R} i_f^r \cdot \sum_{n=1}^{N} \omega \cdot n \cdot (g_{\phi pqrn} \cdot \cos(n \cdot \theta) - h_{\phi pqrn} \cdot \sin(n \cdot \theta))$$

For notational convenience and to reflect the unobservability of the $i_f$ term, the following identities are defined as a result of considering the last two Σ terms in Equation (11):

$$\sum_{r=0}^{R} i_f^r \cdot g_{\phi pqrn} = G_{\phi pqn} \qquad \text{for all } \phi, p \text{ and } q \quad (12)$$

$$\sum_{r=0}^{R} i_f^r \cdot h_{\phi pqrn} = H_{\phi pqn} \qquad \text{for all } \phi, p \text{ and } q \quad (13)$$

To retain consistency with Equation (10) for the case in which phase current varies, the harmonic terms (n) in Equation (11) are not collected into the H and G terms defined by Equations (12) and (13). Substituting Equations (12) and (13) into Equation (11) results in:

$$v_\phi = R_\phi + i_\alpha \cdot R_{\phi\alpha} + i_\beta \cdot R_{\phi\beta} + i_\alpha \cdot i_\beta \cdot R_{\phi\alpha\beta} \cdots + \quad (14)$$

$$\sum_{p=0}^{P} i_\alpha^p \cdot \sum_{q=0}^{Q} i_\beta^q \cdot \sum_{n=1}^{N} \omega \cdot n \cdot (G_{\phi pqn} \cdot \cos(n \cdot \theta) - H_{\phi pqn} \cdot \sin(n \cdot \theta))$$

Division throughout Equation (14) by ω yields:

$$\frac{v_\phi}{\omega} = \frac{1}{\omega} \cdot R_\phi + \frac{i_\alpha}{\omega} \cdot R_{\phi\alpha} + \frac{i_\beta}{\omega} \cdot R_{\phi\beta} + \frac{i_\alpha \cdot i_\beta}{\omega} \cdot R_{\phi\alpha\beta} \cdots + \quad (15)$$

$$\sum_{p=0}^{P} i_\alpha^p \cdot \sum_{q=0}^{Q} i_\beta^q \cdot \sum_{n=1}^{N} n \cdot (G_{\phi pqn} \cdot \cos(n \cdot \theta) - H_{\phi pqn} \cdot \sin(n \cdot \theta))$$

Using Equation (14), the motor parameters can be estimated in the case of constant phase current.

As noted above, practical motor applications involve varying current. Equation (8) describes how the flux model coefficients, first presented in Equation (1), propagate through three separate paths when calculating phase voltage in the variable current case. The first path, as previously encountered, passes through those expressions explicitly involving ω. The other two paths involve expressions with time derivatives of the currents. As before, ω is divided throughout and substitutions as indicated in Equations (12) and (13) are made, yielding:

$$\frac{v_\phi}{\omega} = \frac{1}{\omega} \cdot R_\phi + \frac{i_\alpha}{\omega} \cdot R_{\phi\alpha} + \frac{i_\beta}{\omega} \cdot R_{\phi\beta} + \frac{i_\alpha \cdot i_\beta}{\omega} \cdot R_{\phi\alpha\beta} \cdots + \quad (16)$$

$$\left[\frac{1}{\omega} \cdot \left(\frac{d}{dt} i_\alpha\right)\right] \cdot \sum_{p=1}^{P} p i_\alpha^{p-1} \cdot \sum_{q=0}^{Q} i_\beta^q \cdot \sum_{n=0}^{N} (G_{\phi pqn} \cdot \sin(n \cdot \theta) + H_{\phi pqn} \cdot \cos(n \cdot \theta)) \cdots +$$

$$\left[\frac{1}{\omega} \cdot \left(\frac{d}{dt} i_\beta\right)\right] \cdot \sum_{p=0}^{P} i_\alpha^p \cdot \sum_{q=1}^{Q} q i_\beta^{q-1} \cdot \sum_{n=0}^{N} (G_{\phi pqn} \cdot \sin(n \cdot \theta) + H_{\phi pqn} \cdot \cos(n \cdot \theta)) \cdots +$$

$$\sum_{p=0}^{P} i_\alpha^p \cdot \sum_{q=0}^{Q} i_\beta^q \cdot \sum_{n=1}^{N} n \cdot (G_{\phi pqn} \cdot \cos(n \cdot \theta) - H_{\phi pqn} \cdot \sin(n \cdot \theta))$$

Note that:

$$\frac{1}{\omega} \cdot \left(\frac{d}{dt} i\right) = \frac{1}{\left(\frac{d}{dt}\theta\right)} \cdot \frac{d}{dt} i = \left(\frac{d}{d\theta} t\right) \cdot \left(\frac{d}{dt} i\right) = \frac{d}{d\theta} i$$

This allows a simple re-working of Equation (16) as follows:

$$\frac{v_\phi}{\omega} = \frac{1}{\omega} \cdot R_\phi + \frac{i_\alpha}{\omega} \cdot R_{\phi\alpha} + \frac{i_\beta}{\omega} \cdot R_{\phi\beta} + \frac{i_\alpha \cdot i_\beta}{\omega} \cdot R_{\phi\alpha\beta} \cdots +$$

$$\left(\frac{d}{d\theta} i_\alpha\right) \cdot \sum_{p=1}^{P} p i_\alpha^{p-1} \cdot \sum_{q=0}^{Q} i_\beta^q \cdot \sum_{n=0}^{N} (G_{\phi pqn} \cdot \sin(n \cdot \theta) + H_{\phi pqn} \cdot \cos(n \cdot \theta)) \cdots +$$

$$\left(\frac{d}{d\theta} i_\beta\right) \cdot \sum_{p=0}^{P} i_\alpha^p \cdot \sum_{q=1}^{Q} q i_\beta^{q-1} \cdot \sum_{n=0}^{N} (G_{\phi pqn} \cdot \sin(n \cdot \theta) + H_{\phi pqn} \cdot \cos(n \cdot \theta)) \cdots +$$

$$\sum_{p=0}^{P} i_\alpha^p \cdot \sum_{q=0}^{Q} i_\beta^q \cdot \sum_{n=1}^{N} n \cdot (G_{\phi pqn} \cdot \cos(n \cdot \theta) - H_{\phi pqn} \cdot \sin(n \cdot \theta))$$

The advantage of this re-formulation of Equation (16) is that two possible sources of impulsive noise in the equation, and the problems they can cause with a parameter estimator, have been removed. If the driving current forms are assumed known, then their derivatives with respect to angle can be directly calculated. If the current forms are defined in an analytic form, such as from a BEMF model, then a closed expression exists for the derivative else a numerical estimate can be obtained. In particular, if at the (k−1) and k intervals the angle and desired currents are $\theta(k-1)$, $\theta(k)$, $i_\alpha(k-1)$ and $i_\alpha(k)$ then:

$$\frac{d}{d\theta} i_\alpha = \frac{i_\alpha(k) - i_\alpha(k-1)}{\theta(k) - \theta(k-1)}$$

This approach implicitly assumes the system exhibits good current following properties.

Since resistance and flux linkage can be estimated via the electrical model, a torque model relating current and angle to torque generated can be derived through a series of standard operations. Very generally, these operations include integrating the flux linkage from zero current to the present value of current—coenergy, and differentiating this expression with respect to shaft angle. The result of these operations is an expression for torque.

Coenergy ($\omega_c$) is defined by:

$$\omega_c = \int \sum_{\phi=1}^{N_\phi} \lambda_\phi d i_\phi \quad (17)$$

where N is the number of stator phases. Thus, for a three-phase switched reluctance motor, $N_\phi=3$ (for the a, b, and c stator phases), while for a three phase PM motor $N_\phi=4$ (for the three stator phases and the imaginary f rotor phase). Torque is found via coenergy by:

$$T = \frac{\partial}{\partial \theta} \omega_c \quad (18)$$

The relationship between the abc-FoR and the $\alpha\beta$ FoR is given by:

$$\begin{pmatrix} i_\alpha \\ i_\beta \\ i_0 \end{pmatrix} = \begin{pmatrix} 1 & 0 & 1 \\ \frac{-1}{2} & \frac{-1}{2} \cdot \sqrt{3} & 1 \\ \frac{-1}{2} & \frac{1}{2} \cdot \sqrt{3} & 1 \end{pmatrix} \cdot \begin{pmatrix} i_a \\ i_b \\ i_c \end{pmatrix}$$

The derivatives of the abc FoR currents are related to the $\alpha\beta$-FoR currents by:

$$d\lambda_a(i_\alpha, i_\beta, i_f, \theta) = \frac{\partial}{\partial i_\alpha} \lambda_a \cdot di_\alpha + \frac{\partial}{\partial i_\beta} \lambda_a \cdot di_\beta + \frac{\partial}{\partial i_f} \lambda_a \cdot di_f \quad (19)$$

$$d\lambda_b(i_\alpha, i_\beta, i_f, \theta) = \frac{\partial}{\partial i_\alpha} \lambda_b \cdot di_\alpha + \frac{\partial}{\partial i_\beta} \lambda_b \cdot di_\beta + \frac{\partial}{\partial i_f} \lambda_b \cdot di_f \quad (20)$$

$$d\lambda_c(i_\alpha, i_\beta, i_f, \theta) = \frac{\partial}{\partial i_\alpha} \lambda_c \cdot di_\alpha + \frac{\partial}{\partial i_\beta} \lambda_c \cdot di_\beta + \frac{\partial}{\partial i_f} \lambda_c \cdot di_f \quad (21)$$

$$d\lambda_f(i_\alpha, i_\beta, i_f, \theta) = \frac{\partial}{\partial i_\alpha} \lambda_f \cdot di_\alpha + \frac{\partial}{\partial i_\beta} \lambda_f \cdot di_\beta + \frac{\partial}{\partial i_f} \lambda_f \cdot di_f \quad (22)$$

and $$di_a = di_\alpha \quad (23)$$

$$di_b = \frac{-1}{2} \cdot di_\alpha - \frac{\sqrt{3}}{2} \cdot di_\beta \quad (24)$$

$$di_c = \frac{-1}{2} \cdot di_\alpha + \frac{\sqrt{3}}{2} \cdot di_\beta \quad (25)$$

$$di_f = di_f \quad (25)$$

Since a switched reluctance machine has no permanent magnets, in the case of a switched reluctance machine Equation (26) is as follows:

$$di_f = 0$$

The expression for coenergy is thus written in the $\alpha\beta$-FoR:

$$\omega_c = \int \lambda_a di_\alpha - \frac{1}{2} \cdot \int \lambda_b di_\alpha - \frac{\sqrt{3}}{2} \cdot \int \lambda_b di_\beta - \frac{1}{2} \cdot \int \lambda_c di_\alpha + \frac{\sqrt{3}}{2} \cdot \int \lambda_c di_\beta + \int \lambda_f di_f \quad (27)$$

For convenience, the individual integral components of this expression are set equal to $D_1$, $D_2$, $D_3$, $D_4$, $D_5$ and $D_6$, respectively:

$$\omega_c = D_1 - \frac{1}{2} \cdot D_2 - \frac{\sqrt{3}}{2} \cdot D_3 - \frac{1}{2} D_4 + \frac{\sqrt{3}}{2} \cdot D_5 + D_6 \quad (28)$$

Again, in the particular case of a switched reluctance machine:

$$D_6 \equiv 0$$

For a switched reluctance machine, Equations (27) and (28) therefore reduce to:

$$\omega_c = \int \lambda_a di_\alpha - \frac{1}{2} \cdot \int \lambda_b di_\alpha - \frac{\sqrt{3}}{2} \cdot \int \lambda_b di_\beta - \frac{1}{2} \cdot \int \lambda_c di_\alpha + \frac{\sqrt{3}}{2} \cdot \int \lambda_c di_\beta - \quad (29)$$

$$\omega_c = D_1 - \frac{1}{2} \cdot D_2 - \frac{\sqrt{3}}{2} \cdot D_3 - \frac{1}{2} D_4 + \frac{\sqrt{3}}{2} \cdot D_5 \quad (30)$$

Next, an integral path is selected. To this end, an integral path consisting of three directed line segments (DLS) is defined over which to evaluate the integral giving coenergy. For the purposes of this disclosure, the dummy variable of integration is $\xi$ while phase current variables ($i_a, i_b, i_c, i_\alpha, i_\beta$) are in lower case. Their associated final values, with respect to path integrals, are ($I_a, I_b, I_c, I_\alpha, I_\beta$).

Directed line segment one:
$i_\alpha = 0$ $di_\alpha = 0$
$i_\beta = 0$ $di_\beta = 0$
$i_f$ is the variable of integration, ranging from 0 to $I_f$.

Figure 3:
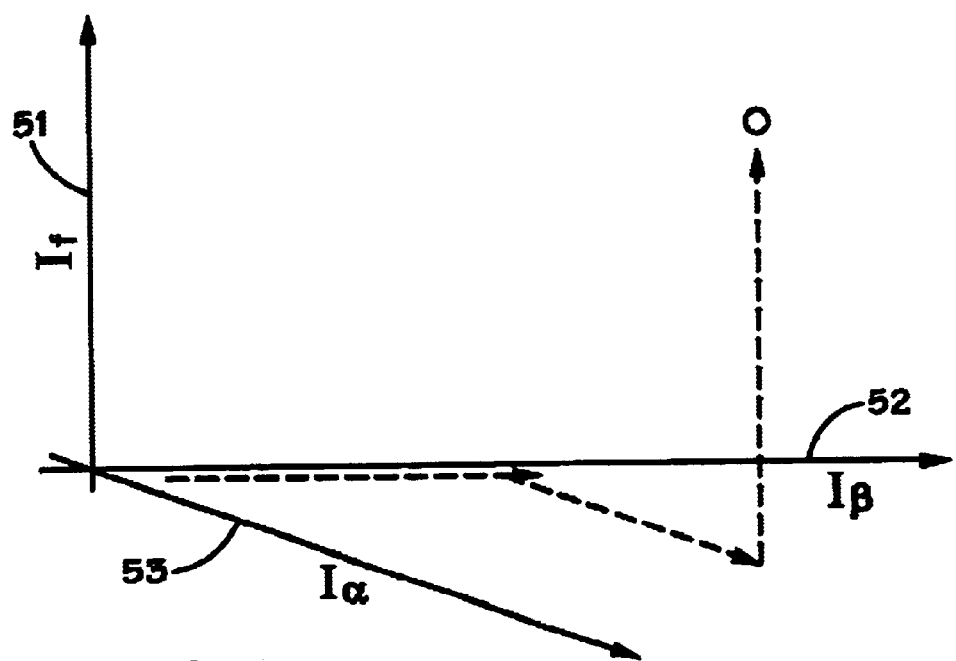
FIG. 3 is a chart illustrating an exemplary integration path for evaluating an integral giving coenergy used in embodiments of the invention.

Directed line segment two:
$i_\alpha = 0$ $di_\alpha = 0$
$i_\beta$ is the variable of integration, ranging from 0 to $I_\beta$
$i_f = I_f$ $di_f = 0$ Directed line segment three:
$i_\alpha$ is the variable of integration, ranging from 0 to $I_\alpha$
$i_\beta = I_\beta$ $di_\beta = 0$
$i_f = I_f$ $di_f = 0$ FIG. 3 illustrates an integration path defined as a sequence of directed line segments 51, 52, 53.

Each of the integrals $D_1$–$D_6$ are then evaluated over the selected path. Evaluating $D_1$:, $$D_1 = \int \lambda_a di_\alpha$$

This is identically zero over all but the third DLS, hence:

$$D_1 = \int_0^{I_\alpha} \sum_{p=0}^{P} \xi^p \cdot \sum_{q=0}^{Q} I_\beta^q \cdot \sum_{r=0}^{R} I_f^r \cdot \sum_{n=0}^{N} (g_{apqm} \cdot \sin(n \cdot \theta) + h_{apqm} \cdot \cos(n \cdot \theta)) d\xi \quad (31)$$

yielding:

$$D_1 = \sum_{p=0}^{P} \frac{I_\alpha^{p+1}}{p+1} \cdot \sum_{q=0}^{Q} I_\beta^q \cdot \sum_{r=0}^{R} I_f^r \cdot \sum_{n=0}^{N} (g_{apqm} \cdot \sin(n \cdot \theta) + h_{apqm} \cdot \cos(n \cdot \theta))$$

Evaluating $D_2$:

$$D_2 = \int \lambda_b di_\alpha$$

This is also identically zero over all but the third directed line segment.

$$D_2 = \int_0^{I_\alpha} \sum_{p=0}^{P} \xi^p \cdot \sum_{q=0}^{Q} I_\beta^q \cdot \sum_{r=0}^{R} I_f^r \cdot \sum_{n=0}^{N} (g_{bpqm} \cdot \sin(n \cdot \theta) + h_{bpqm} \cdot \cos(n \cdot \theta)) d\xi \quad (32)$$

yielding:

$$D_2 = \sum_{p=0}^{P} \frac{I_\alpha^{p+1}}{p+1} \cdot \sum_{q=0}^{Q} I_\beta^q \cdot \sum_{r=0}^{R} I_f^r \cdot \sum_{n=0}^{N} (g_{bpqm} \cdot \sin(n \cdot \theta) + h_{bpqm} \cdot \cos(n \cdot \theta))$$

Evaluating $D_3$:

$$D_3 = \int \lambda_b di_\beta$$

This is identically zero over all but the second directed line segment, where all terms other than those where p=0 are zero:

$$D_3 = \int_0^{l_\beta} \sum_{q=0}^{Q} \xi^q \cdot \sum_{r=0}^{R} I_f^r \cdot \sum_{n=0}^{N} (g_{b0qm} \cdot \sin(n \cdot \theta) + h_{b0qm} \cdot \cos(n \cdot \theta)) d\xi \quad (33)$$

yielding:

$$D_3 = \sum_{q=0}^{Q} \frac{I_\beta^{q+1}}{q+1} \cdot \sum_{r=0}^{R} I_f^r \cdot \sum_{n=0}^{N} (g_{b0qm} \cdot \sin(n \cdot \theta) + h_{b0qm} \cdot \cos(n \cdot \theta))$$

Evaluating $D_4$:

$$D_4 = \int \lambda_c di_\alpha$$

This is identically zero over all but the third directed fine segment, where all terms are zero except for those where p=q=0:

$$D_4 = \int_0^{l_\alpha} \left[ \sum_{p=0}^{P} \xi^p \cdot \sum_{q=0}^{Q} I_\beta^q \cdot \sum_{r=0}^{R} I_f^r \cdot \sum_{n=0}^{N} (g_{cpqm} \cdot \sin(n \cdot \theta) + h_{cpqm} \cdot \cos(n \cdot \theta)) \right] d\xi \quad (34)$$

yielding:

$$D_4 = \sum_{p=0}^{P} \frac{I_\alpha^{p+1}}{p+1} \cdot \sum_{q=0}^{Q} I_\beta^q \cdot \sum_{r=0}^{R} I_f^r \cdot \sum_{n=0}^{N} (g_{cpqm} \cdot \sin(n \cdot \theta) + h_{cpqm} \cdot \cos(n \cdot \theta))$$

Evaluating $D_5$:

$$D_5 = \int \lambda_c di_\beta$$

This is identically zero over all but the second directed line segment.

$$D_5 = \int_0^{l_\beta} \sum_{q=0}^{Q} \xi^q \cdot \sum_{r=0}^{R} I_f^r \cdot \sum_{n=0}^{N} (g_{c0qm} \cdot \sin(n \cdot \theta) + h_{c0qm} \cdot \cos(n \cdot \theta)) d\xi \quad (35)$$

yielding:

$$D_5 = \sum_{q=0}^{Q} \frac{I_\beta^{q+1}}{q+1} \cdot \sum_{r=0}^{R} I_f^r \cdot \sum_{n=0}^{N} (g_{c0qm} \cdot \sin(n \cdot \theta) + h_{c0qm} \cdot \cos(n \cdot \theta))$$

Evaluating $D_6$:

$$D_6 = \int \lambda_f di_f$$

This term is identically zero over all but the first directed line segment.

$$D_6 = \int_0^{l_f} \left[ \sum_{r=0}^{R} i_f^r \cdot \sum_{n=0}^{N} (g_{f00m} \cdot \sin(n \cdot \theta) + h_{f00m} \cdot \cos(n \cdot \theta)) \right] d\xi \quad (36)$$

yielding:

$$D_6 = \sum_{r=0}^{R} \frac{I_f^r}{r+1} \cdot \sum_{n=0}^{N} (g_{f00m} \cdot \sin(n \cdot \theta) + h_{f00m} \cdot \cos(n \cdot \theta))$$

Substituting for $D_i$, i=1, ... ,6 into Equation (29):

$$\omega_c = \left[\sum_{p=0}^{P} \frac{I_\alpha^{p+1}}{p+1} \cdot \sum_{q=0}^{Q} I_\beta^q \cdot \sum_{r=0}^{R} I_f^r \cdot \sum_{n=0}^{N} (g_{apqm} \cdot \sin(n \cdot \theta) + h_{apqm} \cdot \cos(n \cdot \theta))\right]... + \quad (37)$$

$$\frac{-1}{2} \cdot \left[\sum_{p=0}^{P} \frac{I_\alpha^{p+1}}{p+1} \cdot \sum_{q=0}^{Q} I_\beta^q \cdot \sum_{r=0}^{R} I_f^r \cdot \sum_{n=0}^{N} (g_{bpqm} \cdot \sin(n \cdot \theta) + h_{bpqm} \cdot \cos(n \cdot \theta))\right]... +$$

$$\frac{-\sqrt{3}}{2} \cdot \left[\sum_{q=0}^{Q} \frac{I_\beta^{q+1}}{q+1} \cdot \sum_{r=0}^{R} I_f^r \cdot \sum_{n=0}^{N} (g_{b0qm} \cdot \sin(n \cdot \theta) + h_{b0qm} \cdot \cos(n \cdot \theta))\right]... +$$

$$\frac{-1}{2} \cdot \left[\sum_{p=0}^{P} \frac{I_\alpha^{p+1}}{p+1} \cdot \sum_{q=0}^{Q} I_\beta^q \cdot \sum_{r=0}^{R} I_f^r \cdot \sum_{n=0}^{N} (g_{cpqm} \cdot \sin(n \cdot \theta) + h_{cpqm} \cdot \cos(n \cdot \theta))\right]... +$$

$$\frac{\sqrt{3}}{2} \cdot \left[\sum_{q=0}^{Q} \frac{I_\beta^{q+1}}{q+1} \cdot \sum_{r=0}^{R} I_f^r \cdot \sum_{n=0}^{N} (g_{c0qm} \cdot \sin(n \cdot \theta) + h_{c0qm} \cdot \cos(n \cdot \theta))\right]... +$$

$$\sum_{r=0}^{R} \frac{I_f^r}{r+1} \cdot \sum_{n=0}^{N} (g_{f00m} \cdot \sin(n \cdot \theta) + h_{f00m} \cdot \cos(n \cdot \theta))$$

Substituting Equation (37) into Equation (18):

$$T = \left[\sum_{p=0}^{P} \frac{I_\alpha^{p+1}}{p+1} \cdot \sum_{q=0}^{Q} I_\beta^q \cdot \sum_{r=0}^{R} I_f^r \cdot \sum_{n=1}^{N} n \cdot (g_{apqm} \cdot \cos(n \cdot \theta) - h_{apqm} \cdot \sin(n \cdot \theta))\right]... + \quad (38)$$

$$\frac{-1}{2} \cdot \left[\sum_{p=0}^{P} \frac{I_\alpha^{p+1}}{p+1} \cdot \sum_{q=0}^{Q} I_\beta^q \cdot \sum_{r=0}^{R} I_f^r \cdot \sum_{n=1}^{N} n \cdot (g_{bpqm} \cdot \cos(n \cdot \theta) - h_{bpqm} \cdot \sin(n \cdot \theta))\right]... +$$

$$\frac{-\sqrt{3}}{2} \cdot \left[\sum_{q=0}^{Q} \frac{I_\beta^{q+1}}{q+1} \cdot \sum_{r=0}^{R} I_f^r \cdot \sum_{n=1}^{N} n \cdot (g_{b0qm} \cdot \cos(n \cdot \theta) - h_{b0qm} \cdot \sin(n \cdot \theta))\right]... +$$

$$\frac{-1}{2} \cdot \left[\sum_{p=0}^{P} \frac{I_\alpha^{p+1}}{p+1} \cdot \sum_{q=0}^{Q} I_\beta^q \cdot \sum_{r=0}^{R} I_f^r \cdot \sum_{n=1}^{N} n \cdot (g_{cpqm} \cdot \cos(n \cdot \theta) - h_{cpqm} \cdot \sin(n \cdot \theta))\right]... +$$

$$\frac{\sqrt{3}}{2} \cdot \left[\sum_{q=0}^{Q} \frac{I_\beta^{q+1}}{q+1} \cdot \sum_{r=0}^{R} I_f^r \cdot \sum_{n=1}^{N} n \cdot (g_{c0qm} \cdot \cos(n \cdot \theta) - h_{c0qm} \cdot \sin(n \cdot \theta))\right]... +$$

$$\sum_{r=0}^{R} \frac{I_f^r}{r+1} \cdot \sum_{n=1}^{N} n \cdot (g_{f00m} \cdot \cos(n \cdot \theta) - h_{f00m} \cdot \sin(n \cdot \theta))$$

Using the identities introduced earlier in Equations (12) and (13), Equation (38) is rewritten:

$$T = \left[\sum_{p=0}^{P} \frac{I_\alpha^{p+1}}{p+1} \cdot \sum_{q=0}^{Q} I_\beta^q \cdot \sum_{n=1}^{N} n \cdot (G_{apqn} \cdot \cos(n \cdot \theta) - H_{apqn} \cdot \sin(n \cdot \theta))\right]... + \quad (38)$$

$$\frac{-1}{2} \cdot \left[\sum_{p=0}^{P} \frac{I_\alpha^{p+1}}{p+1} \cdot \sum_{q=0}^{Q} I_\beta^q \cdot \sum_{n=1}^{N} n \cdot (G_{bpqn} \cdot \cos(n \cdot \theta) - H_{bpqn} \cdot \sin(n \cdot \theta))\right]... +$$

$$\frac{-\sqrt{3}}{2} \cdot \left[\sum_{q=0}^{Q} \frac{I_\beta^{q+1}}{q+1} \cdot \sum_{n=1}^{N} n \cdot (G_{b0qn} \cdot \cos(n \cdot \theta) - H_{b0qn} \cdot \sin(n \cdot \theta))\right]... +$$

$$\frac{-1}{2} \cdot \left[\sum_{p=0}^{P} \frac{I_\alpha^{p+1}}{p+1} \cdot \sum_{q=0}^{Q} I_\beta^q \cdot \sum_{n=1}^{N} n \cdot (G_{cpqn} \cdot \cos(n \cdot \theta) - H_{cpqn} \cdot \sin(n \cdot \theta))\right]... +$$

-continued $$\frac{\sqrt{3}}{2} \cdot \left[ \sum_{q=0}^{Q} \frac{I_\beta^{q+1}}{q+1} \cdot \sum_{n=1}^{N} n \cdot (G_{c0qn} \cdot \cos(n \cdot \theta) - H_{c0qn} \cdot \sin(n \cdot \theta)) \right] \ldots +$$

$$\sum_{r=0}^{R} \frac{I_f^r}{r+1} \cdot \sum_{n=1}^{N} n \cdot (g_{f00m} \cdot \cos(n \cdot \theta) - h_{f00m} \cdot \sin(n \cdot \theta))$$

The electrical model parameters naturally flow from the expression for flux linkage to that for torque. However, for motors employing permanent magnets, additional parameters appear as the electrical model is transformed into the torque model. Physically, these parameters relate to how the magnets on the motor interact with themselves—cogging parameters. It is not mathematically obvious how changes in motor terminal current and voltage, as the motor spins, indicate or measure this behavior. In other words, the cogging parameters are unobservable solely via feedback from the motor terminals as the rotor turns.

Various methods in accordance with the present invention are available to deal with these unobservable parameters. For example, in one embodiment, the torque model terms with unobservable parameters are grouped together:

$$T = \sum_{p=0}^{P} \frac{I_\alpha^{p+1}}{p+1} \cdot \sum_{q=0}^{Q} I_\beta^q \cdot \sum_{n=1}^{N} n \cdot \left[ \begin{array}{l} \left( G_{apqn} - \frac{G_{bpqn}}{2} - \frac{G_{cpqn}}{2} \right) \cdot \cos(n \cdot \theta) \ldots + \\ \left( -H_{apqn} + \frac{H_{bpqn}}{2} + \frac{H_{cpqn}}{2} \right) \cdot \sin(n \cdot \theta) \end{array} \right] \ldots +$$

$$\sum_{q=0}^{Q} \frac{I_\beta^{q+1}}{q+1} \cdot \sum_{n=1}^{N} \frac{\sqrt{3}}{2} \cdot n \cdot [(-G_{b0qn} + G_{c0qn}) \cdot \cos(n \cdot \theta) + (H_{b0qn} - H_{c0qn}) \cdot \sin(n \cdot \theta)] \ldots +$$

$$\sum_{r=0}^{R} \frac{I_f^r}{r+1} \cdot \sum_{n=1}^{N} n \cdot (g_{f00m} \cdot \cos(n \cdot \theta) - h_{f00m} \cdot \sin(n \cdot \theta))$$

For the particular case of a switched reluctance machine these parameters are simply not present (no magnets in the motor construction) and Equation (39) reduces to:

$$T = \sum_{p=0}^{P} \frac{I_\alpha^{p+1}}{p+1} \cdot \sum_{q=0}^{Q} I_\beta^q \cdot \sum_{n=1}^{N} n \cdot \left[ \begin{array}{l} \left( g_{apqn} - \frac{g_{bpqn}}{2} - \frac{g_{cpqn}}{2} \right) \cdot \cos(n \cdot \theta) \ldots \\ + \left( -h_{apqn} + \frac{h_{bpqn}}{2} + \frac{h_{cpqn}}{2} \right) \cdot \sin(n \cdot \theta) \end{array} \right] \ldots + \quad (40)$$

$$\sum_{q=0}^{Q} \frac{I_\beta^{q+1}}{q+1} \cdot \sum_{n=1}^{N} n \cdot \frac{\sqrt{3}}{2} \cdot [(-g_{b0qn} + g_{c0qn}) \cdot \cos(n \cdot \theta) + (h_{b0qn} - h_{c0qn}) \cdot \sin(n \cdot \theta)]$$

The triple and first double summation terms in Equation (39) involve coefficients that are observable through the motor terminals while the second double summation groups those terms that are not observable.

Cogging torque is measured, directly or indirectly, to provide data used to derive an expression that can be substituted for the unknown grouped terms. For example, by spinning the motor on a test rig (no current applied to the motor windings) and measuring the cogging, a Fourier series can be fitted directly to the test data and this known expression is substituted for the unknown grouped terms. Consider Equation (39) in the particular case when there no current is flowing in the stator phases:

$$I_\alpha = I_\beta = 0$$

The grouped unobservable terms from Equation (39) are as follows:

$$\sum_{r=0}^{R} \frac{I_f^r}{r+1} \cdot \sum_{n=1}^{N} (g_{f00m} \cdot \cos(n \cdot \theta) - h_{f00m} \cdot \sin(n \cdot \theta))$$

Since $I_f$ is nominally constant, the effect of cogging can be modeled by a trigonometric polynomial:

$$\sum_{n=1}^{N} (p_n \cdot \sin(n \cdot \theta) + q_n \cdot \cos(n \cdot \theta)) \quad (41)$$

The $p_n$ and $q_n$ parameters are provided by the cogging torque measurement obtained from the unenergized motor. It is then assumed that Equation (41) can replace the unobservable component of the expression for torque in Equation (39), that is:

$$\sum_{r=0}^{R} \frac{I_f^r}{r+1} \cdot \sum_{n=1}^{N} n \cdot (g_{f00rn} \cdot \cos(n \cdot \theta) - h_{f00rn} \cdot \sin(n \cdot \theta)) = $$

$$\sum_{n=1}^{N} (p_k \cdot \sin(n \cdot \theta) + q_k \cdot \cos(n \cdot \theta))$$

which yields:

$$T = \sum_{p=0}^{P} \frac{I_\alpha^{p+1}}{p+1} \cdot \sum_{q=0}^{Q} I_\beta^q \cdot \sum_{n=1}^{N} n \cdot \left[ \begin{array}{c} \left( G_{apqn} - \frac{G_{bpqn}}{2} - \frac{G_{cpqn}}{2} \right) \cdot \cos(n \cdot \theta) \ldots + \\ \left( -H_{apqn} + \frac{H_{bpqn}}{2} + \frac{H_{cpqn}}{2} \right) \cdot \sin(n \cdot \theta) \end{array} \right] \ldots + \tag{42}$$

$$\sum_{q=0}^{Q} \frac{I_\beta^{q+1}}{q+1} \cdot \sum_{n=1}^{N} n \cdot \left[ \left( \frac{-\sqrt{3}}{2} \cdot G_{b0qn} + \frac{\sqrt{3}}{2} \cdot G_{c0qn} \right) \cdot \cos(n \cdot \theta) + \left( \frac{\sqrt{3}}{2} \cdot H_{b0qn} - \frac{\sqrt{3}}{2} \cdot H_{c0qn} \right) \cdot \sin(n \cdot \theta) \right] \ldots + $$

$$\sum_{r=1}^{N} (p_k \cdot \sin(n \cdot \theta) + q_k \cdot \cos(n \cdot \theta))$$

Other techniques in accordance with the invention use an indirect measurement of cogging torque. This generally involves three steps. First, during commissioning, the motor is spun at speed unloaded (free shaft) at one or more speeds. Since there is no load applied to the motor shaft, the motor current is minimal. A simple linear voltage model (for example, including only phase currents and BEMF components—the $\alpha$ and $\beta$ currents appear independent and to the first power only) of the motor is fitted from the voltage, current and shaft sensor information. The linear model will predict the operation of the motor at light loads quite accurately. Next, the torque model for the motor is derived as described previously from the linear voltage motor. The torque model will predict the output torque of the motor at light loads quite accurately.

In an alternative method, during commissioning, the motor is spun at speed unenergized and the terminal voltage is measured. Using this data, part of the complete motor model, the BEMF component, can be fitted. Using the same method as that for the complete model, a torque can be created from this partial electrical model. The resultant model does not fully describe how the motor generates torque over the full current range, but for small values of current it is reasonably accurate.

The motor is then controlled so that position is maintained. That is, the controller energizes the windings until the motor holds a demanded position, against the cogging torque (it is assumed that no other load is applied—the motor is operating free shaft). Knowing a relatively accurate torque model for these low current ranges, the value of cogging torque at any particular angle can now be calculated. In this way, by repeating the above process over a full revolution, data can be collected concerning the cogging model. A Fourier series, for example, can be fitted, a look-up table can be created, etc., as previously and this is used in place of those terms in the torque model that involves unobservable parameters.

For numerical reasons it is desirable that the $\alpha\beta$-FoR currents are normalized so that they lie in the closed interval $[-1,1]$. This process is best understood by considering Equation (1):

$$\lambda_\phi = \sum_{p=0}^{P} i_\alpha^p \cdot \sum_{q=0}^{Q} i_\beta^q \cdot \sum_{r=0}^{R} i_f^r \cdot \sum_{n=0}^{N} (g_{\phi pqrn} \cdot \sin(n \cdot \theta) + h_{\phi pqrn} \cdot \cos(n \cdot \theta)) \tag{1}$$

Assuming flux is directly measured and that measured currents are normalized using some scale factor I, then Equation (1) becomes:

$$\lambda_\phi = \sum_{p=0}^{P} \left(\frac{i_\alpha}{I}\right)^p \cdot \sum_{q=0}^{Q} \left(\frac{i_\beta}{I}\right)^q \cdot \sum_{r=0}^{R} \left(\frac{i_f}{I}\right)^r \cdot \sum_{n=0}^{N} (g_{\phi pqrn} \cdot \sin(n \cdot \theta) + h_{\phi pqrn} \cdot \cos(n \cdot \theta)) \tag{43}$$

The corresponding voltage equation is given by:

$$v_\phi = R_\phi + \frac{i_\alpha}{I} \cdot R_{\phi\alpha} + \frac{i_\beta}{I} \cdot R_{\phi\beta} + \frac{i_\alpha}{I} \cdot \frac{i_\beta}{I} \cdot R_{\phi\alpha\beta} \ldots + \tag{44}$$

$$\sum_{p=1}^{P} \left[ p\left(\frac{i_\alpha}{I}\right)^{p-1} \cdot \frac{d}{dt}\left(\frac{i_\alpha}{I}\right) \right] \cdot \sum_{q=0}^{Q} \left(\frac{i_\beta}{I}\right)^q \cdot \sum_{r=0}^{R} \left(\frac{i_f}{I}\right)^r \cdot \sum_{n=0}^{N} (g_{\phi pqrn} \cdot \sin(n \cdot \theta) + h_{\phi pqrn} \cdot \cos(n \cdot \theta)) \ldots + $$

$$\sum_{p=0}^{P} \left(\frac{i_\alpha}{I}\right)^p \cdot \sum_{q=1}^{Q} \left[ q\left(\frac{i_\beta}{I}\right)^{q-1} \cdot \frac{d}{dt}\left(\frac{i_\beta}{I}\right) \right] \sum_{r=0}^{R} \left(\frac{i_f}{I}\right)^r \cdot \sum_{n=0}^{N} (g_{\phi pqrn} \cdot \sin(n \cdot \theta) + h_{\phi pqrn} \cdot \cos(n \cdot \theta)) \ldots + $$

$$\sum_{p=0}^{P}\left(\frac{i_\alpha}{I}\right)^p \cdot \sum_{q=0}^{Q}\left(\frac{i_\beta}{I}\right)^q \cdot \sum_{r=0}^{R}\left(\frac{i_f}{I}\right)^r \cdot \sum_{n=1}^{N} \omega \cdot n \cdot (g_{\phi pqrn} \cdot \cos(n \cdot \theta) - h_{\phi pqrn} \cdot \sin(n \cdot \theta))$$

Terms such as $$\frac{d}{dt}\left(\frac{i_\alpha}{I}\right)$$

correspond to the derivative of the normalized current. Two further equations of interest referenced earlier are those relating flux to coenergy and coenergy to torque:

$$\omega_c = \int \sum_{\phi=1}^{N_\phi} \lambda_\phi d i_\phi \quad (17)$$

$$T = \frac{\partial}{\partial \theta} \omega_c \quad (18)$$

The integral in Equation (17) is with respect to true current measurement. From this, if the torque equation is evaluated using normalized current then true torque value is obtained my multiplying by the scaling factor I.

The torque model is used by the solver 34 to calculate appropriate currents for smooth torque with zero angle sensitivity. Over a single revolution of the shaft, the torque levels calculated may be such as to reject some disturbance. Further, as discussed above, errors in position measurement degrade performance, and the performance tends to rapidly deteriorate with errors in angular measurement. To achieve smooth torque with zero, or at least reduced sensitivity to angular measurement, a solution is derived that considers the change in torque with respect to angle, then minimizes this variance. First, a set of nonlinear equations are solved. For N functional relationships involving variables $x_i$, i=1, . . . ,N:

$$F_i(x_1, x_2, \ldots, x_N) = 0 \quad i=1, \ldots, N \quad (45)$$

Adopting vector notation and expanding the functions $F_i$ using the Taylor series:

$$F_i(x + \delta x) = F_i(x) + \sum_{j=1}^{N} \frac{\partial}{\partial x_j} F_i \cdot \delta x_j + O(\delta x^2) \quad (46)$$

The Jacobian is written:

$$J_{ij} = \frac{\partial}{\partial x_j} F_i \quad (47)$$

Then:

$$F(x + \delta x) = F(x) + J \cdot \delta x + O(\delta x^2) \quad (48)$$

From this, a set of linear equations is obtained:

$$J \cdot \delta x_{new} = -F \quad (49)$$

Solving the linear equation above yields:

$$x_{new} = x_{old} + \delta x_{new} \quad (50)$$

In this particular case, the non-linear equations are for torque and zero sensitivity with respect to angle condition.

In the problem under discussion, while the Jacobian matrix will generally be small (two by two or three by three) there is little computational cost in calculating the inverse. However, there is significant overhead in calculating the individual elements of the Jacobian. One way to reduce the cost of computing is to keep the Jacobian constant for some number of iterations p>1. Such a technique (cyclic updating of the Jacobian matrix) offsets the reduction in computational cost with a deterioration in convergence rate for the solution. There are also multi-dimensional secant-type methods that avoid the explicit calculation of the Jacobian through the use of multi-dimensional finite differencing.

With the method described above, the initial guess to the solution has to be reasonably close because global convergence is not guaranteed. This typically is not problematical while searching for solutions for PM motors but may be so for switched reluctance motors. One possible solution is to examine the use of quasi-Newton methods, which possess global convergence properties, possibly with a restart scheme.

Torque may be calculated via coenergy using Equation (39), repeated as follows:

$$T = \sum_{p=0}^{P} \frac{I_\alpha^{p+1}}{p+1} \cdot \sum_{q=0}^{Q} I_\beta^q \cdot \quad (39)$$

$$\sum_{n=1}^{N} n \cdot \left[ \begin{array}{l} \left(G_{apqn} - \frac{G_{bpqn}}{2} - \frac{G_{cpqn}}{2}\right) \cdot \cos(n \cdot \theta) \ldots + \\ \left(-H_{apqn} + \frac{H_{bpqn}}{2} + \frac{H_{cpqn}}{2}\right) \cdot \sin(n \cdot \theta) \end{array} \right] \ldots +$$

$$\sum_{q=0}^{Q} \frac{I_\beta^{q+1}}{q+1} \cdot \sum_{n=1}^{N} \frac{\sqrt{3}}{2} \cdot n \cdot [(-G_{b0qn} + G_{c0qn}) \cdot \cos(n \cdot \theta) +$$

$$(H_{b0qn} - H_{c0qn}) \cdot \sin(n \cdot \theta)] \ldots +$$

$$\sum_{r=0}^{R} \frac{I_f^r}{r+1} \cdot \sum_{n=1}^{N} n \cdot (g_{f00rn} \cdot \cos(n \cdot \theta) - h_{f00rn} \cdot \sin(n \cdot \theta))$$

Ignoring the unobservable parameters and re-arranging Equation (39) yields:

$$0 = \sum_{p=0}^{P} \frac{I_\alpha^{p+1}}{p+1} \cdot \sum_{q=0}^{Q} I_\beta^q \cdot \quad (51)$$

$$\sum_{n=1}^{N} n \cdot \left[ \begin{array}{l} \left(G_{apqn} - \frac{G_{bpqn}}{2} - \frac{G_{cpqn}}{2}\right) \cdot \cos(n \cdot \theta) \ldots + \\ \left(-H_{apqn} + \frac{H_{bpqn}}{2} + \frac{H_{cpqn}}{2}\right) \cdot \sin(n \cdot \theta) \end{array} \right] \ldots +$$

$$\sum_{q=0}^{Q} \frac{I_\beta^{q+1}}{q+1} \cdot \sum_{n=1}^{N} \frac{\sqrt{3}}{2} \cdot n \cdot [(-G_{b0qn} + G_{c0qn}) \cdot \cos(n \cdot \theta) +$$

$$(H_{b0qn} - H_{c0qn}) \cdot \sin(n \cdot \theta)] - T$$

The necessary partial derivatives or entries to the Jacobian, with respect to $i_\alpha$ and $i_\beta$, can now be derived.

$$\frac{\partial}{\partial i_\alpha} T(i_\alpha, i_\beta, \theta) = \quad (52)$$

$$\sum_{p=0}^{P} I_\alpha^p \cdot \sum_{q=0}^{Q} I_\beta^q \cdot \sum_{n=1}^{N} n \cdot \left[ \begin{array}{l} \left(G_{apqn} - \frac{G_{bpqn}}{2} - \frac{G_{cpqn}}{2}\right) \cdot \cos(n \cdot \theta) \ldots + \\ \left(-H_{apqn} + \frac{H_{bpqn}}{2} + \frac{H_{cpqn}}{2}\right) \cdot \sin(n \cdot \theta) \end{array} \right]$$

$$\frac{\partial}{\partial i_\beta} T(i_\alpha, i_\beta, \theta) = \sum_{p=0}^{P} \frac{I_\alpha^{p+1}}{p+1} \cdot \sum_{q=0}^{Q} q I_\beta^{q-1} \cdot \quad (53)$$

$$\sum_{n=1}^{N} n \cdot \left[ \begin{array}{l} \left(G_{apqn} - \frac{G_{bpqn}}{2} - \frac{G_{cpqn}}{2}\right) \cdot \cos(n \cdot \theta) \ldots + \\ \left(-H_{apqn} + \frac{H_{bpqn}}{2} + \frac{H_{cpqn}}{2}\right) \cdot \sin(n \cdot \theta) \end{array} \right] \ldots +$$

$$\sum_{q=0}^{Q} I_\beta^q \cdot \sum_{n=1}^{N} \frac{\sqrt{3}}{2} \cdot n \cdot \left[ \begin{array}{l} (-G_{b0qn} + G_{c0qn}) \cdot \cos(n \cdot \theta) \ldots + \\ (-H_{b0qn} - H_{c0qn}) \cdot \sin(n \cdot \theta) \end{array} \right]$$

Hence:

$$J_{11} = \sum_{p=0}^{P} I_\alpha^p \cdot \quad (54)$$

$$\sum_{q=0}^{Q} I_\beta^q \cdot \sum_{n=1}^{N} n \cdot \left[ \begin{array}{l} \left(G_{apqn} - \frac{G_{bpqn}}{2} - \frac{G_{cpqn}}{2}\right) \cdot \cos(n \cdot \theta) \ldots + \\ \left(-H_{apqn} + \frac{H_{bpqn}}{2} + \frac{H_{cpqn}}{2}\right) \cdot \sin(n \cdot \theta) \end{array} \right]$$

$$J_{12} = \sum_{p=0}^{P} \frac{I_\alpha^{p+1}}{p+1} \cdot \sum_{q=0}^{Q} q I_\beta^{q-1} \cdot \quad (55)$$

$$\sum_{n=1}^{N} n \cdot \left[ \begin{array}{l} \left(G_{apqn} - \frac{G_{bpqn}}{2} - \frac{G_{cpqn}}{2}\right) \cdot \cos(n \cdot \theta) \ldots + \\ \left(-H_{apqn} + \frac{H_{bpqn}}{2} + \frac{H_{cpqn}}{2}\right) \cdot \sin(n \cdot \theta) \end{array} \right] \ldots +$$

$$\sum_{q=0}^{Q} I_\beta^q \cdot \sum_{n=1}^{N} \frac{\sqrt{3}}{2} \cdot n \cdot [(-G_{b0qn} + G_{c0qn}) \cdot \cos(n \cdot \theta) +$$

$$(H_{b0qn} - H_{c0qn}) \cdot \sin(n \cdot \theta)]$$

Regarding zero angular sensitivity, sensitivity with respect to angle is given by:

$$\frac{\partial}{\partial \theta} T \quad (56)$$

From Equation (39):

$$\frac{\partial}{\partial \theta} T = \sum_{p=0}^{P} \frac{I_\alpha^{p+1}}{p+1} \cdot \sum_{q=0}^{Q} I_\beta^q \cdot \quad (57)$$

$$\sum_{n=1}^{N} n^2 \cdot \left[ \begin{array}{l} -\left(G_{apqn} - \frac{G_{bpqn}}{2} - \frac{G_{cpqn}}{2}\right) \cdot \sin(n \cdot \theta) \ldots + \\ \left(-H_{apqn} + \frac{H_{bpqn}}{2} + \frac{H_{cpqn}}{2}\right) \cdot \cos(n \cdot \theta) \end{array} \right] \ldots +$$

$$\sum_{q=0}^{Q} \frac{I_\beta^{q+1}}{q+1} \cdot \sum_{n=1}^{N} n^2 \cdot \frac{\sqrt{3}}{2} \cdot \left[ \begin{array}{l} -(-G_{b0qn} + G_{c0qn}) \cdot \sin(n \cdot \theta) \ldots + \\ (H_{b0qn} - H_{c0qn}) \cdot \cos(n \cdot \theta) \end{array} \right]$$

Hence:

$$J_{21} = \frac{\partial}{\partial i_\alpha} \frac{\partial}{\partial \theta} T \quad (58)$$

and:

$$J_{22} = \frac{\partial}{\partial i_\beta} \frac{\partial}{\partial \theta} T \quad (59)$$

By changing the order of the partial derivatives, in Equations (58) and (59):

$$J_{21} = \frac{\partial}{\partial \theta} J_{11} \quad (60)$$

$$J_{22} = \frac{\partial}{\partial \theta} J_{12} \quad (61)$$

As noted above, cogging torque cannot be estimated using data available solely from the motor terminals. The cogging model discussed above can be incorporated directly into the solver 34. Recall that the observable and unobservable torque model terms were grouped together in Equation (39). If total motor torque is separated into torque estimated via terminal variables ($T_{tv}$) and cogging torque ($T_{cog}$), then:

$$T = T_{tv} + T_{cog} \quad (62)$$

and $$\frac{\partial}{\partial \theta} T = \frac{\partial}{\partial \theta} T_{tv} + \frac{\partial}{\partial \theta} T_{cog} \quad (63)$$

Considering $T_{cog}$ as solely a function of angle (representing the angle dependant but current independent cogging) in terms of a Fourier series:

$$\frac{\partial}{\partial i_\alpha} T_{cog} = \frac{\partial}{\partial i_\beta} T_{cog} = 0 \quad (64)$$

$$\frac{\partial}{\partial i_\alpha}\left(\frac{\partial}{\partial \theta} T_{cog}\right) = \frac{\partial}{\partial i_\beta}\left(\frac{\partial}{\partial \theta} T_{cog}\right) = 0 \quad (65)$$

From Equations (64) and (65) it is seen that there is no effect upon the calculation of the Jacobian matrix, see Equation (39) and Equations (51) to (61). The only effect is upon the calculation of true torque (T) and its partial derivative with respect to angle, or the sensitivity. Recall Equation (39):

$$T = \sum_{p=0}^{P} \frac{I_\alpha^{p+1}}{p+1} \cdot \sum_{q=0}^{Q} I_\beta^q \cdot \sum_{n=1}^{N} n \cdot \left[ \begin{array}{l} \left( G_{apqn} - \frac{G_{bpqn}}{2} - \frac{G_{cpqn}}{2} \right) \cdot \cos(n \cdot \theta) \ldots \\ + \left( -H_{apqn} + \frac{H_{bpqn}}{2} + \frac{H_{cpqn}}{2} \right) \cdot \sin(n \cdot \theta) \end{array} \right] \ldots +$$

$$\sum_{q=0}^{Q} \frac{I_\beta^{q+1}}{q+1} \cdot \sum_{n=1}^{N} n \frac{\sqrt{3}}{2} \cdot [(-G_{b0qn} + G_{c0qn}) \cdot \cos(n \cdot \theta) + (H_{b0qn} - H_{c0qn}) \cdot \sin(n \cdot \theta)] \ldots +$$

$$\sum_{r=0}^{R} \frac{I_f^r}{r+1} \cdot \sum_{n=1}^{N} n \cdot (g_{f00m} \cdot \cos(n \cdot \theta) - h_{f00m} \cdot \sin(n \cdot \theta))$$

If, as mentioned previously, $T_{cog}$ is treated as a function of mechanical angle via a Fourier series:

$$T_{cog}(\theta) = \sum_{n=1}^{N_C} (a_n \cdot \sin(n \cdot \theta) + b_n \cdot \cos(n \cdot \theta)) \tag{66}$$

then Equation (39) yields:

$$T = \sum_{p=0}^{P} \frac{I_\alpha^{p+1}}{p+1} \cdot \sum_{q=0}^{Q} I_\beta^q \cdot \sum_{n=1}^{N} n \cdot \left[ \begin{array}{l} \left( G_{apqn} - \frac{G_{bpqn}}{2} - \frac{G_{cpqn}}{2} \right) \cdot \cos(n \cdot \theta) \ldots + \\ \left( -H_{apqn} + \frac{H_{bpqn}}{2} + \frac{H_{cpqn}}{2} \right) \cdot \sin(n \cdot \theta) \end{array} \right] \ldots + \tag{67}$$

$$\sum_{q=0}^{Q} \frac{I_\beta^{q+1}}{q+1} \cdot \sum_{n=1}^{N} \frac{\sqrt{3}}{2} \cdot n \cdot [(-G_{b0qn} + G_{c0qn}) \cdot \cos(n \cdot \theta) + (H_{b0qn} - H_{c0qn}) \cdot \sin(n \cdot \theta)] \ldots +$$

$$\sum_{n=1}^{N_C} (a_n \cdot \sin(n \cdot \theta) + b_n \cdot \cos(n \cdot \theta))$$

True sensitivity is then the partial derivative with respect to angle of the expression for torque presented in Equation (67), see Equation (57):

$$S_a = \sum_{p=0}^{P} \frac{I_\alpha^{p+1}}{p+1} \cdot \sum_{q=0}^{Q} I_\beta^q \cdot \sum_{n=1}^{N} n^2 \cdot \left[ \begin{array}{l} -\left( G_{apqn} - \frac{G_{bpqn}}{2} - \frac{G_{cpqn}}{2} \right) \cdot \sin(n \cdot \theta) \ldots \\ + \left( -H_{apqn} + \frac{H_{bpqn}}{2} + \frac{H_{cpqn}}{2} \right) \cdot \cos(n \cdot \theta) \end{array} \right] \ldots + \tag{68}$$

$$\sum_{q=0}^{Q} \frac{I_\beta^{q+1}}{q+1} \cdot \sum_{n=1}^{N} \frac{\sqrt{3} \cdot n^2}{2} \cdot [-(-G_{b0qn} + G_{c0qn}) \cdot \sin(n \cdot \theta) + (H_{b0qn} - H_{c0qn}) \cdot \cos(n \cdot \theta)] \ldots +$$

$$\sum_{n=1}^{N_C} n \cdot (a_n \cdot \cos(n \cdot \theta) - b_n \cdot \sin(n \cdot \theta))$$

To this point it has been assumed that the smooth torque solution is achieved in a point by point manner. An alternative approach is to calculate the solution across the angle intervals in the interval $(0, 2\pi)$ simultaneously. For convenience, the following nomenclature is introduced. Suppose for a particular torque and sensitivity demand the solution is to be calculated at various angles:

$\theta(k)$ for all $k=1, \ldots, N$

The current column vector is given by:

$$I = \begin{pmatrix} i_\alpha(\theta(1)) \\ i_\alpha(\theta(2)) \\ \vdots \\ i_\alpha(\theta(N)) \\ i_\beta(\theta(1)) \\ i_\beta(\theta(2)) \\ \vdots \\ i_\beta(\theta(N)) \end{pmatrix} \quad (69)$$

If the new $$I(n+1)=I(n)+\Delta(n) \quad (70)$$

The $k^{th}$ torque vector is a row vector defined by:

$$\phi_{Tk}=(0 \ldots 0 T(\theta(k),i_\alpha(k),i_\beta(k))0 \ldots 0)$$

Similarly, the k'th sensitivity vector is defined by:

$$\phi_{Sk}=(0 \ldots 0 S(\theta(k),i_\alpha(k),i_\beta(k))0 \ldots 0)$$

These vectors can be stacked to form diagonal matrices:

$$A = \begin{pmatrix} \phi_{T1} \\ \vdots \\ \phi_{TN} \end{pmatrix} \quad B = \begin{pmatrix} \phi_{S1} \\ \vdots \\ \phi_{SN} \end{pmatrix}$$

Finally, appropriate partial derivatives with respect to the currents are taken and the resultant matrices aggregated to form a 2N by 2N matrix:

$$\Phi = \begin{pmatrix} \frac{\partial}{\partial i_\alpha} A & \frac{\partial}{\partial i_\beta} A \\ \frac{\partial}{\partial i_\alpha} B & \frac{\partial}{\partial i_\beta} B \end{pmatrix} \quad (71)$$

The desired torque and sensitivity at a particular angle $\theta(k)$ are given by:

$$T(\theta(k)) \; S(\theta(k))$$

The 2N×1 demand vector D of these values over the angle range is given by:

$$D = \begin{pmatrix} T_d(\theta(1)) \\ T_d(\theta(2)) \\ \vdots \\ T_d(\theta(N)) \\ S_d(\theta(1)) \\ \vdots \\ S_d(\theta(1)) \end{pmatrix} \quad (72)$$

and the actual values of torque and sensitivity resultant from any current combination ($i_\alpha,i_\beta$) which constitute the iterated solution are given by the column vector:

$$A = \begin{pmatrix} T(\theta(1), i_\alpha(1), i_\beta(1)) \\ T(\theta(2), i_\alpha(2), i_\beta(2)) \\ \vdots \\ T(\theta(N), i_\alpha(N), i_\beta(N)) \\ S(\theta(1), i_\alpha(1), i_\beta(1)) \\ \vdots \\ S(\theta(N), i_\alpha(N), i_\beta(N)) \end{pmatrix} \quad (73)$$

Using this notation and from the development initially presented:

$$\Delta(n)=\Phi^{-1}\cdot(D-A) \quad (74)$$

with:

$$I(n+1)=I(n)+\Delta(n)$$

Starting from a reasonable guess, three to fifteen iterations is typically sufficient when dealing with a PM motor. As in the switched reluctance motor case previously, issues of convergence becomes critical. Typical seed values for the PM motor are usually chosen to lie upon a sine wave generated with some harmonic appropriate to the machine in question. Hence, in the unstacked version of the solver:

$$\begin{pmatrix} i_\alpha \\ i_\beta \end{pmatrix} = \begin{pmatrix} 0.2 \\ -0.2 \end{pmatrix}$$

In the stacked version this expression is replaced with sine feeds of the appropriate magnitude and harmonic, for example, five in a 12-10 PM motor.

An alternative to approach to that outlined above is to view the problem as a constrained non-linear optimization task with respect to the alpha beta currents for each angle:

$$\frac{\partial}{\partial \theta} T(i_\alpha, i_\beta, \theta(k)) = 0$$

$$T(i_\alpha,i_\beta,\theta(k))=T_{demand}$$

$$MIN(i_\alpha^2+i_\beta^2)$$

Such a problem is a particular case of that described in *Sensitivity of Automatic Control Systems* by Rosenwasser and Yusupov (CRC Press, 1999).

In some cases where cogging frequencies are high, the resultant current profiles may prove difficult to follow. Of course, increasingly complex and expensive drives can provide better current profile following capabilities. In practice, a reasonable balance between cost and current following capabilities is required. One solution is the removal of the higher harmonic terms from all the sensitivity expressions presented throughout this disclosure. In particular, consider the expression presented in Equation (71). If the higher harmonic terms are ignored, above $N_t$, then:

$$S_a = \sum_{p=0}^{P} \frac{I_\alpha^{p+1}}{p+1} \cdot \sum_{q=0}^{Q} I_\beta^q. \quad (75)$$

-continued $$\sum_{n=1}^{N} n^2 \cdot \begin{bmatrix} -\left(G_{apqn} - \frac{G_{bpqn}}{2} - \frac{G_{cpqn}}{2}\right) \cdot \sin(n \cdot \theta) \ldots + \\ \left(-H_{apqn} + \frac{H_{bpqn}}{2} + \frac{H_{cpqn}}{2}\right) \cdot \cos(n \cdot \theta) \end{bmatrix} \ldots +$$

$$\sum_{q=0}^{Q} \frac{I_\beta^{q+1}}{q+1} \cdot \sum_{n=1}^{N} \frac{\sqrt{3} \cdot n^2}{2} \cdot [-(-G_{b\alpha qn} + G_{c\alpha qn}) \cdot \sin(n \cdot \theta) +$$

$$(H_{b\alpha qn} - H_{c\alpha qn}) \cdot \cos(n \cdot \theta)] \ldots +$$

$$\sum_{n=1}^{N_t} n \cdot (a_n \cdot \cos(n \cdot \theta) - b_n \cdot \sin(n \cdot \theta))$$

Typically the cut-off harmonic will be in the range 35 to 40. This will result in smoother current profiles, which in the presence of error in angular precision, will introduce higher frequency torque ripple somewhat more quickly than would otherwise be the case.

If balanced feed is not used, it is necessary to use the abc-FoR. As with the αβ-FoR discussion above, the following disclosure is generally provided in terms of a three phase hybrid motor, though the model form can be generalized into different types of rotating machines having any number of phases by one skilled in the art having the benefit of this disclosure. For notational convenience, the abc-stator phases are represented by "1," "2" and "3" subscripts, while the single rotor phase is represented by a "4" subscript.

The general form of the flux linkage model in the abc-FoR is given by:

$$\lambda_\phi(i_1, i_2, i_3, i_4, \theta) = \sum_{p=0}^{P} i_1^p \cdot \sum_{q=0}^{Q} i_2^q \cdot \qquad (76)$$

$$\sum_{r=0}^{R} i_3^r \cdot \sum_{s=0}^{S} i_4^s \cdot \sum_{n=1}^{N} (g_{\phi pqrsn} \cdot \sin(n \cdot \theta) + h_{\phi pqrsn} \cdot \cos(n \cdot \theta))$$

Equation (4) provides the known equation:

$$v_\phi = i_\phi \cdot R_\phi + \frac{d}{dt} \lambda_\phi \qquad (4)$$

From Equation (76):

$$\frac{d}{dt} \lambda_\phi = \sum_{p=0}^{P} p \cdot i_1^{p-1} \cdot \left(\frac{d}{dt} i_1\right) \cdot \sum_{q=0}^{Q} i_2^q \cdot \sum_{r=0}^{R} i_3^r \cdot \qquad (77)$$

$$\sum_{s=0}^{S} i_4^s \cdot \sum_{n=1}^{N} (g_{\phi pqrsn} \cdot \sin(n \cdot \theta) + h_{\phi pqrsn} \cdot \cos(n \cdot \theta)) \ldots +$$

$$\sum_{p=0}^{P} i_1^p \cdot \sum_{q=0}^{Q} q i_2^{q-1} \cdot \left(\frac{d}{dt} i_2\right) \cdot \sum_{r=0}^{R} i_3^r \cdot$$

$$\sum_{s=0}^{S} i_4^s \cdot \sum_{n=1}^{N} (g_{\phi pqrsn} \cdot \sin(n \cdot \theta) + h_{\phi pqrsn} \cdot \cos(n \cdot \theta)) \ldots +$$

$$\sum_{p=0}^{P} i_1^p \cdot \sum_{q=0}^{Q} i_2^q \cdot \sum_{r=0}^{R} r \cdot i_3^{r-1} \cdot \left(\frac{d}{dt} i_3\right) \cdot$$

$$\sum_{s=0}^{S} i_4^s \cdot \sum_{n=1}^{N} (g_{\phi pqrsn} \cdot \sin(n \cdot \theta) + h_{\phi pqrsn} \cdot \cos(n \cdot \theta)) \ldots +$$

$$\sum_{p=0}^{P} i_1^p \cdot \sum_{q=0}^{Q} i_2^q \cdot \sum_{r=0}^{R} i_3^r \cdot \sum_{s=0}^{S} s i_4^{s-1} \cdot \left(\frac{d}{dt} i_4\right) \cdot$$

$$\sum_{n=1}^{N} (g_{\phi pqrsn} \cdot \sin(n \cdot \theta) + h_{\phi pqrsn} \cdot \cos(n \cdot \theta)) \ldots +$$

$$\sum_{p=0}^{P} i_1^p \cdot \sum_{q=0}^{Q} i_2^q \cdot \sum_{r=0}^{R} i_3^r \cdot \sum_{s=0}^{S} i_4^s \cdot \sum_{n=1}^{N} \omega \cdot n \cdot$$

$$(g_{\phi pqrsn} \cdot \cos(n \cdot \theta) - h_{\phi pqrsn} \cdot \sin(n \cdot \theta))$$

Substituting Equation (77) into Equation (4):

$$v_\phi = i_\phi \cdot R_\phi + \sum_{p=0}^{P} p \cdot i_1^{p-1} \cdot \left(\frac{d}{dt} i_1\right) \cdot \sum_{q=0}^{Q} i_2^q \cdot \sum_{r=0}^{R} i_3^r \cdot \qquad (78)$$

$$\sum_{s=0}^{S} i_4^s \cdot \sum_{n=1}^{N} (g_{\phi pqrsn} \cdot \sin(n \cdot \theta) + h_{\phi pqrsn} \cdot \cos(n \cdot \theta)) \ldots +$$

$$\sum_{p=0}^{P} i_1^p \cdot \sum_{q=0}^{Q} q i_2^{q-1} \cdot \left(\frac{d}{dt} i_2\right) \cdot \sum_{r=0}^{R} i_3^r \cdot$$

$$\sum_{s=0}^{S} i_4^s \cdot \sum_{n=1}^{N} (g_{\phi pqrsn} \cdot \sin(n \cdot \theta) + h_{\phi pqrsn} \cdot \cos(n \cdot \theta)) \ldots +$$

$$\sum_{p=0}^{P} i_1^p \cdot \sum_{q=0}^{Q} i_2^q \cdot \sum_{r=0}^{R} r \cdot i_3^{r-1} \cdot \left(\frac{d}{dt} i_3\right) \cdot$$

$$\sum_{s=0}^{S} i_4^s \cdot \sum_{n=1}^{N} (g_{\phi pqrsn} \cdot \sin(n \cdot \theta) + h_{\phi pqrsn} \cdot \cos(n \cdot \theta)) \ldots +$$

$$\sum_{p=0}^{P} i_1^p \cdot \sum_{q=0}^{Q} i_2^q \cdot \sum_{r=0}^{R} i_3^r \cdot \sum_{s=0}^{S} s i_4^{s-1} \cdot \left(\frac{d}{dt} i_4\right) \cdot$$

$$\sum_{n=1}^{N} (g_{\phi pqrsn} \cdot \sin(n \cdot \theta) + h_{\phi pqrsn} \cdot \cos(n \cdot \theta)) \ldots +$$

$$\sum_{p=0}^{P} i_1^p \cdot \sum_{q=0}^{Q} i_2^q \cdot \sum_{r=0}^{R} i_3^r \cdot \sum_{s=0}^{S} i_4^s \cdot \sum_{n=1}^{N} \omega \cdot n \cdot$$

$$(g_{\phi pqrsn} \cdot \cos(n \cdot \theta) - h_{\phi pqrsn} \cdot \sin(n \cdot \theta))$$

As noted herein above, in the particular case of a switched reluctance motor:

$$i_j = 0 \text{ and}$$

$$\frac{d}{dt}i_f \equiv 0 \qquad (9)$$

So in the case of a switched reluctance motor, Equation (78) yields $$v_\phi = i_\phi \cdot R_\phi + \sum_{p=0}^{P} p \cdot i_1^{p-1} \cdot \left(\frac{d}{dt}i_1\right) \cdot \qquad (79)$$

$$\sum_{q=0}^{Q} i_2^q \cdot \sum_{r=0}^{R} i_3^r \cdot \sum_{n=1}^{N} (g_{\phi pqrsn} \cdot \sin(n \cdot \theta) + h_{\phi pqrsn} \cdot \cos(n \cdot \theta)) \ldots +$$

$$\sum_{p=0}^{P} i_1^p \cdot \sum_{q=0}^{Q} q i_2^{q-1} \cdot \left(\frac{d}{dt}i_2\right) \cdot$$

$$\sum_{r=0}^{R} i_3^r \cdot \sum_{n=1}^{N} (g_{\phi pqrsn} \cdot \sin(n \cdot \theta) + h_{\phi pqrsn} \cdot \cos(n \cdot \theta)) \ldots +$$

$$\sum_{p=0}^{P} i_1^p \cdot \sum_{q=0}^{Q} i_2^q \cdot \sum_{r=0}^{R} r \cdot i_3^{r-1} \cdot \left(\frac{d}{dt}i_3\right) \cdot \sum_{n=1}^{N} (g_{\phi pqrsn} \cdot \sin(n \cdot \theta) +$$

$$h_{\phi pqrsn} \cdot \cos(n \cdot \theta)) \ldots + \sum_{p=0}^{P} i_1^p \cdot \sum_{q=0}^{Q} i_2^q \cdot$$

$$\sum_{r=0}^{R} i_3^r \cdot \sum_{n=1}^{N} \omega \cdot n \cdot (g_{\phi pqrsn} \cdot \cos(n \cdot \theta) - h_{\phi pqrsn} \cdot \sin(n \cdot \theta))$$

Recall from Equations (17) and (18), coenergy and torque are found using the expressions:

$$\omega_c = \int \sum_{\phi=1}^{4} \lambda_\phi d i_\phi \qquad (17)$$

$$T = \frac{\partial}{\partial \theta}\omega_c \qquad (18)$$

Any reasonable integral path can be selected; in certain embodiments four directed line segments are used:

Variable of integration $i_4$ $di_4 \neq C$ $i_1, i_2, i_3, di_1, di_2, di_3 = C$
Variable of integration $i_1$ $di_1 \neq C$ $i_4 = I_4$ $i_2, i_3, di_2, di_3, di_4 = C$
Variable of integration $i_2$ $di_2 \neq C$ $i_4 = I_4$ $i_1 = I_1$ $i_3, di_1, di_3, di_4 = C$
Variable of integration $i_3$ $di_3 \neq C$ $i_4 = I_4$ $i_1 = I_1$ $i_2 = I_2$ $di_1, di_2, di_4 = C$ This path is selected to minimize the number of unobservable parameters appearing in the final expression for torque.

The integrals are then evaluated over the selected path. Substituting Equation (76) into Equation (17):

$$\omega_c = \qquad (80)$$

$$\int \left[\sum_{\phi=1}^{4} \sum_{p=0}^{P} i_1^p \cdot \sum_{q=0}^{Q} i_2^q \cdot \sum_{r=0}^{R} i_3^r \cdot \sum_{s=0}^{S} i_4^s \cdot \sum_{n=1}^{N} (g_{\phi pqrsn} \cdot \sin(n \cdot \theta) + \right.$$

-continued $$\left. h_{\phi pqrsn} \cdot \cos(n \cdot \theta))\right] d i_\phi$$

For notational convenience, this integral is re-written:

$$\omega_c = \sum_{\phi=1}^{4} F_\phi \qquad (81)$$

where, for $\phi = 1, \ldots, 4$:

$$F_\phi = \int \sum_{p=0}^{P} i_1^p \cdot \sum_{q=0}^{Q} i_2^q \cdot \sum_{r=0}^{R} i_3^r \cdot \qquad (82)$$

$$\sum_{s=0}^{S} i_4^s \cdot \sum_{n=1}^{N} (g_{\phi pqrsn} \cdot \sin(n \cdot \theta) + h_{\phi pqrsn} \cdot \cos(n \cdot \theta)) d i_\phi$$

In the particular case of a switched reluctance machine (no permanent magnets) there is no associated stator phase:

$$F_\phi =$$

$$\int \sum_{p=0}^{P} i_1^p \cdot \sum_{q=0}^{Q} i_2^q \cdot \sum_{r=0}^{R} i_3^r \cdot \sum_{n=1}^{N} (g_{\phi pqrsn} \cdot \sin(n \cdot \theta) + h_{\phi pqrsn} \cdot \cos(n \cdot \theta))$$

$$d i_\phi \quad \phi = 1, 2, 3.$$

Integral One ($F_1$):

$$F_1 = \int \sum_{p=0}^{P} i_1^p \cdot \sum_{q=0}^{Q} i_2^q \cdot$$

$$\sum_{r=0}^{R} i_3^r \cdot \sum_{s=0}^{S} i_4^s \cdot \sum_{n=1}^{N} (g_{1pqrsn} \cdot \sin(n \cdot \theta) + h_{1pqrsn} \cdot \cos(n \cdot \theta)) d i_1$$

This is identically zero over all but the second DLS, where:
$i_4 = I_4$ $i_1, i_2, i_3 = C$ $di_2, d_3, d_4 = C$
hence:

$$F_1 =$$

$$\int_0^{I_1} \sum_{p=0}^{P} \xi^p \cdot \sum_{s=0}^{S} I_4^s \cdot \sum_{n=1}^{N} (g_{1p00sn} \cdot \sin(n \cdot \theta) + h_{1p00sn} \cdot \cos(n \cdot \theta)) d\xi$$

yielding:

$$F_1 = \sum_{p=0}^{P} \frac{I_1^{p+1}}{p+1} \cdot \sum_{s=0}^{S} I_4^s \cdot \sum_{n=1}^{N} (g_{1p00sn} \cdot \sin(n \cdot \theta) + h_{1p00sn} \cdot \cos(n \cdot \theta)) \qquad (83)$$

Integral Two ($F_2$):

$$F_2 = \int \sum_{p=0}^{P} i_1^p \cdot$$

-continued $$\sum_{q=0}^{Q} i_2^q \cdot \sum_{r=0}^{R} i_3^r \cdot \sum_{s=0}^{S} I_4^s \cdot \sum_{n=1}^{N} (g_{2pqrsn} \cdot \sin(n \cdot \theta) + h_{2pqrsn} \cdot \cos(n \cdot \theta)) di_2$$

This is identically zero along all but the third DLS, where:

$i_4 = I_4 \; i_r = I_1 \; i_1, i_3 = C \; di_1, di_3, di_4 = C$ hence:

$$F_2 = \int_0^{I_2} \sum_{p=0}^{P} I_1^p \cdot$$

$$\sum_{q=0}^{Q} \xi^q \cdot \sum_{s=0}^{S} I_4^s \cdot \sum_{n=1}^{N} (g_{2pq0sn} \cdot \sin(n \cdot \theta) + h_{2pq0sn} \cdot \cos(n \cdot \theta)) d\xi$$

yielding:

$$F_2 = \sum_{p=0}^{P} I_1^p \cdot \qquad (84)$$

$$\sum_{q=0}^{Q} \frac{I_2^{q+1}}{q+1} \cdot \sum_{s=0}^{S} I_4^s \cdot \sum_{n=1}^{N} (g_{2pq0sn} \cdot \sin(n \cdot \theta) + h_{2pq0sn} \cdot \cos(n \cdot \theta))$$

Integral Three ($F_3$):

$$F_3 = \int \sum_{p=0}^{P} i_1^p \cdot$$

$$\sum_{q=0}^{Q} i_2^q \cdot \sum_{r=0}^{R} i_3^r \cdot \sum_{s=0}^{S} i_4^s \cdot \sum_{n=1}^{N} (g_{3pqrsn} \cdot \sin(n \cdot \theta) + h_{3pqrsn} \cdot \cos(n \cdot \theta)) di_3$$

This is identically zero along all but the fourth DLS, where:

$i_4 = I_4 \; i_r = I_1 \; i_2 = I_2 \; di_1, di_2, di_4 = C$ hence:

$$F_3 = \int_0^{I_3} \sum_{p=0}^{P} I_1^p \cdot \sum_{q=0}^{Q} I_2^q \cdot \sum_{r=0}^{R} \xi^r \cdot$$

$$\sum_{s=0}^{S} I_4^s \cdot \sum_{n=1}^{N} (g_{3pqrsn} \cdot \sin(n \cdot \theta) + h_{3pqrsn} \cdot \cos(n \cdot \theta)) d\xi$$

yielding:

$$F_3 = \sum_{p=0}^{P} I_1^p \cdot \sum_{q=0}^{Q} I_2^q \cdot \qquad (85)$$

$$\sum_{r=0}^{R} \frac{I_3^{r+1}}{r+1} \cdot \sum_{s=0}^{S} I_4^s \cdot \sum_{n=1}^{N} (g_{3pqrsn} \cdot \sin(n \cdot \theta) + h_{3pqrsn} \cdot \cos(n \cdot \theta))$$

Integral Four ($F_4$):

$$F_4 = \int \sum_{p=0}^{P} i_1^p \cdot \sum_{q=0}^{Q} i_2^q \cdot$$

$$\sum_{r=0}^{R} i_3^r \cdot \sum_{s=0}^{S} i_4^s \cdot \sum_{n=1}^{N} (g_{4pqrsn} \cdot \sin(n \cdot \theta) + h_{4pqrsn} \cdot \cos(n \cdot \theta)) di_4$$

This is identically zero along all but the first DLS, where:

$i_1, i_2, i_3, di_1, di_2, di_3 = C$ $$F_4 = \int_0^{I_f} \sum_{s=0}^{S} \xi^s \cdot \sum_{n=1}^{N} (g_{4000sn} \cdot \sin(n \cdot \theta) + h_{4000sn} \cdot \cos(n \cdot \theta)) d\xi$$

yielding $$F_4 = \sum_{s=0}^{S} \frac{I_f^{s+1}}{s+1} \cdot \sum_{n=1}^{N} (g_{4000sn} \cdot \sin(n \cdot \theta) + h_{4000sn} \cdot \cos(n \cdot \theta)) \qquad (86)$$

Substituting Equations (83) to (86) into Equation (81) results in the expression:

$$\omega_c = \qquad (87)$$

$$\sum_{p=0}^{P} \frac{I_1^{p+1}}{p+1} \cdot \sum_{s=0}^{S} I_4^s \cdot \sum_{n=1}^{N} (g_{1p00sn} \cdot \sin(n \cdot \theta) + h_{1p00sn} \cdot \cos(n \cdot \theta)) \ldots +$$

$$\sum_{p=0}^{P} I_1^p \cdot \sum_{q=0}^{Q} \frac{I_2^{q+1}}{q+1} \cdot$$

$$\sum_{s=0}^{S} I_4^s \cdot \sum_{n=1}^{N} (g_{2pq0sn} \cdot \sin(n \cdot \theta) + h_{2pq0sn} \cdot \cos(n \cdot \theta)) \ldots +$$

$$\sum_{p=0}^{P} I_1^p \cdot \sum_{q=0}^{Q} I_2^q \cdot \sum_{r=0}^{R} \frac{I_3^{r+1}}{r+1} \cdot$$

$$\sum_{s=0}^{S} I_4^s \cdot \sum_{n=1}^{N} (g_{3pqrsn} \cdot \sin(n \cdot \theta) + h_{3pqrsn} \cdot \cos(n \cdot \theta)) \ldots +$$

$$\sum_{s=0}^{S} \frac{I_f^{s+1}}{s+1} \cdot \sum_{n=1}^{N} (g_{4000sn} \cdot \sin(n \cdot \theta) + h_{4000sn} \cdot \cos(n \cdot \theta))$$

Recalling Equation (18) it is seen that, in the abc-FoR, torque is given by:

$$T = \sum_{p=0}^{P} \frac{I_1^{p+1}}{p+1} \cdot \qquad (88)$$

$$\sum_{s=0}^{S} I_4^s \cdot \sum_{n=1}^{N} n \cdot (g_{1p00sn} \cdot \cos(n \cdot \theta) - h_{1p00sn} \cdot \sin(n \cdot \theta)) \ldots +$$

-continued $$\sum_{p=0}^{P} I_1^p \cdot \sum_{q=0}^{Q} \frac{I_2^{q+1}}{q+1} \cdot$$

$$\sum_{s=0}^{S} I_4^s \cdot \sum_{n=1}^{N} n \cdot (g_{2pq0sn} \cdot \cos(n \cdot \theta) - h_{2pq0sn} \cdot \sin(n \cdot \theta)) \ldots +$$

$$\sum_{p=0}^{P} I_1^p \cdot \sum_{q=0}^{Q} I_2^q \cdot \sum_{r=0}^{R} \frac{I_3^{r+1}}{r+1} \cdot \sum_{s=0}^{S} I_4^s \cdot$$

$$\sum_{n=1}^{N} n \cdot (g_{3pqrsn} \cdot \cos(n \cdot \theta) - h_{3pqrsn} \cdot \sin(n \cdot \theta)) \ldots +$$

$$\sum_{s=0}^{S} \frac{I_f^{s+1}}{s+1} \cdot \sum_{n=1}^{N} n \cdot (g_{4000sn} \cdot \cos(n \cdot \theta) - h_{4000sn} \cdot \sin(n \cdot \theta))$$

In the case of a switched reluctance motor:

$$T = \sum_{p=0}^{P} \frac{I_1^{p+1}}{p+1} \cdot \sum_{n=1}^{N} n \cdot (g_{1p00n} \cdot \cos(n \cdot \theta) - h_{1p00n} \cdot \sin(n \cdot \theta)) \ldots + \tag{89}$$

$$\sum_{p=0}^{P} I_1^p \cdot \sum_{q=0}^{Q} \frac{I_2^{q+1}}{q+1} \cdot$$

$$\sum_{n=1}^{N} n \cdot (g_{2pq0n} \cdot \cos(n \cdot \theta) - h_{2pq0n} \cdot \sin(n \cdot \theta)) \ldots + \sum_{p=0}^{P} I_1^p \cdot$$

$$\sum_{q=0}^{Q} I_2^q \cdot \sum_{r=0}^{R} \frac{I_3^{r+1}}{r+1} \cdot \sum_{n=1}^{N} n \cdot (g_{3pqrn} \cdot \cos(n \cdot \theta) - h_{3pqrn} \cdot \sin(n \cdot \theta))$$

Data collection schemes suitable for parameter estimation were addressed above, including exemplary constant phase current and varying phase current schemes. The varying current scheme, which is typical of practical applications, is considered below. Recall Equation (78):

$$v_\phi = i_\phi \cdot R_\phi + \sum_{p=1}^{P} p \cdot i_1^{p-1} \cdot \left(\frac{d}{dt} i_1\right) \cdot \sum_{q=0}^{Q} i_2^q \cdot \sum_{r=0}^{R} i_3^r \cdot \tag{78}$$

$$\sum_{s=0}^{S} i_4^s \cdot \sum_{n=1}^{N} (g_{\phi pqesn} \cdot \sin(n \cdot \theta) + h_{\phi pqrsn} \cdot \cos(n \cdot \theta)) \ldots +$$

$$\sum_{p=1}^{P} i_1^p \cdot \sum_{q=0}^{Q} q i_2^{q-1} \cdot \left(\frac{d}{dt} i_2\right) \cdot \sum_{r=0}^{R} i_3^r \cdot$$

$$\sum_{s=0}^{S} i_4^s \cdot \sum_{n=1}^{N} (g_{\phi pqrsn} \cdot \sin(n \cdot \theta) + h_{\phi pqrsn} \cdot \cos(n \cdot \theta)) \ldots +$$

$$\sum_{p=1}^{P} i_1^p \cdot \sum_{q=0}^{Q} i_2^q \cdot \sum_{r=0}^{R} r \cdot i_3^{r-1} \cdot \left(\frac{d}{dt} i_3\right) \cdot$$

$$\sum_{s=0}^{S} i_4^s \cdot \sum_{n=1}^{N} (g_{\phi pqrsn} \cdot \sin(n \cdot \theta) + h_{\phi pqrsn} \cdot \cos(n \cdot \theta)) \ldots +$$

$$\sum_{p=1}^{P} i_1^p \cdot \sum_{q=0}^{Q} i_2^q \cdot \sum_{r=0}^{R} i_3^r \cdot \sum_{s=0}^{S} i_4^s \cdot$$

$$\sum_{n=1}^{N} \omega \cdot n \cdot (g_{\phi pqrsn} \cdot \cos(n \cdot \theta) - h_{\phi pqrsn} \cdot \sin(n \cdot \theta))$$

Dividing by angular velocity:

$$\frac{v_\phi}{\omega} = \tag{90}$$

$$\frac{i_\phi}{\omega} \cdot R_\phi + \left[\frac{1}{\omega} \cdot \left(\frac{d}{dt} i_1\right)\right] \cdot \sum_{p=1}^{P} p \cdot i_1^{p-1} \cdot \sum_{q=0}^{Q} i_2^q \cdot \sum_{r=0}^{R} i_3^r \cdot \sum_{s=0}^{S} i_4^s \cdot \sum_{n=1}^{N} (g_{\phi pqrsn} \cdot \sin(n \cdot \theta) + h_{\phi pqrsn} \cdot \cos(n \cdot \theta)) \ldots + \left[\frac{1}{\omega} \cdot \left(\frac{d}{dt} i_2\right)\right] \cdot$$

$$\sum_{p=1}^{P} i_1^p \cdot \sum_{q=0}^{Q} q i_2^{q-1} \cdot \sum_{r=0}^{R} i_3^r \cdot \sum_{s=0}^{S} i_4^s \cdot \sum_{n=1}^{N} (g_{\phi pqrsn} \cdot \sin(n \cdot \theta) + h_{\phi pqrsn} \cdot \cos(n \cdot \theta)) \ldots + \Bigg[$$

$$\frac{1}{\omega} \cdot \left(\frac{d}{dt} i_3\right)\Bigg] \cdot \sum_{p=1}^{P} i_1^p \cdot \sum_{q=0}^{Q} i_2^q \cdot \sum_{r=0}^{R} r \cdot i_3^{r-1} \cdot \sum_{s=0}^{S} i_4^s \cdot \sum_{n=1}^{N} (g_{\phi pqrsn} \cdot \sin(n \cdot \theta) + h_{\phi pqrsn} \cdot \cos(n \cdot \theta)) \ldots +$$

$$\sum_{p=1}^{P} i_1^p \cdot \sum_{q=0}^{Q} i_2^q \cdot \sum_{r=0}^{R} i_3^r \cdot \sum_{s=0}^{S} i_4^s \cdot \sum_{n=1}^{N} n \cdot (g_{\phi pqrsn} \cdot \cos(n \cdot \theta) - h_{\phi pqrsn} \cdot \sin(n \cdot \theta))$$

The state variables assigned to the notional rotor phase are not observable via the motor terminals. Hence, the nominally constant rotor current must be lumped in with those model parameters that are observable, as disclosed above with respect to the model formulated for the αβ-FoR. The following identities are defined:

$$\sum_{s=0}^{S} I_4^s \cdot g_{\phi pqrsn} = G_{\phi pqrn} \text{ for all } p, q \text{ and } r \quad (91)$$

$$\sum_{s=0}^{S} I_4^s \cdot h_{\phi pqrsn} = H_{\phi pqrn} \text{ for all } p, q \text{ and } r \quad (92)$$

Using the identities provided by Equations (91) and (92), Equation (90) yields:

$$\frac{v_\phi}{\omega} = \frac{i_\phi}{\omega} \cdot R_\phi + \left[\frac{1}{\omega} \cdot \left(\frac{d}{dt} i_1\right)\right] \cdot \sum_{p=1}^{P} p \cdot \quad (93)$$

$$i_1^{p-1} \cdot \sum_{q=0}^{Q} i_2^q \cdot \sum_{r=0}^{R} i_3^r \cdot \sum_{n=1}^{N} (G_{\phi pqrn} \cdot \sin(n \cdot \theta) +$$

$$H_{\phi pqrn} \cdot \cos(n \cdot \theta)) \ldots + \left[\frac{1}{\omega} \cdot \left(\frac{d}{dt} i_2\right)\right] \cdot$$

$$\sum_{p=1}^{P} i_1^p \cdot \sum_{q=0}^{Q} q i_2^{q-1} \cdot \sum_{r=0}^{R} i_3^r \cdot \sum_{n=1}^{N} (G_{\phi pqrn} \cdot$$

$$(n \cdot \theta) +_{\phi pqrn} \cdot \cos(n \cdot \theta)) \ldots +$$

-continued $$\left[\frac{1}{\omega} \cdot \left(\frac{d}{dt} i_3\right)\right] \cdot \sum_{p=1}^{P} i_1^p \cdot \sum_{q=0}^{Q} i_2^q \cdot \sum_{r=0}^{R} r \cdot i_3^{r-1} \cdot \sum_{n=1}^{N} (G_{\phi pqrn} \cdot \sin(n \cdot \theta) +$$

$$H_{\phi pqrn} \cdot \cos(n \cdot \theta)) \ldots + \sum_{p=1}^{P} i_1^p \cdot \sum_{q=0}^{Q} i_2^q \cdot$$

$$\sum_{r=0}^{R} i_3^r \cdot \sum_{n=1}^{N} n \cdot (G_{\phi pqrn} \cdot \cos(n \cdot \theta) - H_{\phi pqrn} \cdot \sin(n \cdot \theta))$$

Using the identities presented in Equations (91) and (92), Equation (89) is also re-written:

$$T = \sum_{p=1}^{P} \frac{I_1^{p+1}}{p+1} \cdot \sum_{n=1}^{N} n \cdot (G_{1p00n} \cdot \cos(n \cdot \theta) - H_{1p00n} \cdot \sin(n \cdot \theta)) \ldots + \quad (94)$$

$$\sum_{p=1}^{P} I_1^p \cdot$$

$$\sum_{q=0}^{Q} \frac{I_2^{q+1}}{q+1} \cdot \sum_{n=1}^{N} n \cdot (G_{2pq0n} \cdot \cos(n \cdot \theta) - H_{2pq0n} \cdot \sin(n \cdot \theta)) \ldots +$$

$$\sum_{p=1}^{P} I_1^p \cdot \sum_{q=0}^{Q} I_2^q \cdot \sum_{r=0}^{R} \frac{I_3^{r+1}}{r+1} \cdot$$

$$\sum_{n=1}^{N} n \cdot (G_{3pqrsn} \cdot \cos(n \cdot \theta) - H_{3pqrn} \cdot \sin(n \cdot \theta)) \ldots +$$

$$\sum_{s=0}^{S} \frac{I_f^{s+1}}{s+1} \cdot \sum_{n=1}^{N} n \cdot (g_{4000sn} \cdot \cos(n \cdot \theta) - h_{4000sn} \cdot \sin(n \cdot \theta))$$

and in the particular case of a switched reluctance machine:

$$T = \sum_{p=0}^{P} \frac{I_1^{p+1}}{p+1} \cdot \sum_{n=1}^{N} n \cdot (g_{1p00n} \cdot \cos(n \cdot \theta) - h_{1p00n} \cdot \sin(n \cdot \theta)) \ldots + \quad (95)$$

$$\sum_{p=0}^{P} I_1^p \cdot \sum_{q=0}^{Q} \frac{I_2^{q+1}}{q+1} \cdot \sum_{n=1}^{N} n \cdot (g_{2pq0n} \cdot \cos(n \cdot \theta) - h_{2pq0n} \cdot \sin(n \cdot \theta)) \ldots +$$

$$\sum_{p=0}^{P} I_1^p \cdot \sum_{q=0}^{Q} I_2^q \cdot \sum_{r=0}^{R} \frac{I_3^{r+1}}{r+1} \cdot \sum_{n=1}^{N} n \cdot (g_{3pqrsn} \cdot \cos(n \cdot \theta) - h_{3pqrn} \cdot \sin(n \cdot \theta))$$

Not all model parameters from the voltage fit are present in the final expressions for torque as a result of the path selected in evaluating the integral.

The approach implemented by the solver 34 to calculate the required currents to achieve desired motor behavior, such as smooth torque with angle sensitivity minimized, is similar in the abc-FoR as that disclosed above with regard to the αβ-FoR. The main difference is that the Jacobian is a three by three matrix with the third row elements being given by some constriction upon the values which the abc-FoR currents may take. For the purposes of the current disclosure, it will be assumed that any solution chosen will in some way minimize the sum of squares of the individual phase currents.

Suppose torque is calculated via coenergy using the torque model with abc-FoR set out in Equation (88):

$$T = \sum_{p=0}^{P} \frac{I_1^{p+1}}{p+1} \cdot \sum_{n=1}^{N} n \cdot (G_{1p00n} \cdot \cos(n \cdot \theta) - H_{1p00n} \cdot \sin(n \cdot \theta)) \ldots + \tag{88}$$

$$\sum_{p=0}^{P} I_1^{p} \cdot \sum_{q=0}^{Q} \frac{I_2^{q+1}}{q+1} \cdot \sum_{n=1}^{N} n \cdot (G_{2pq0n} \cdot \cos(n \cdot \theta) - H_{2pq0n} \cdot \sin(n \cdot \theta)) \ldots +$$

$$\sum_{p=0}^{P} I_1^{p} \cdot \sum_{q=0}^{Q} I_2^{q} \cdot \sum_{r=0}^{R} \frac{I_3^{r+1}}{r+1} \cdot \sum_{n=1}^{N} n \cdot (G_{3pqrsn} \cdot \cos(n \cdot \theta) - H_{3pqrn} \cdot \sin(n \cdot \theta)) \ldots +$$

$$\sum_{s=0}^{S} \frac{I_f^{s+1}}{s+1} \cdot \sum_{n=1}^{N} n \cdot (g_{4000sn} \cdot \cos(n \cdot \theta) - h_{4000sn} \cdot \sin(n \cdot \theta))$$

The necessary partial derivatives or entries to the Jacobian, with respect to $i_1, i_2$ and $i_3$, can now be derived.

$$\frac{\partial}{\partial i_1} T = \sum_{p=0}^{P} I_1^{p} \cdot \sum_{n=1}^{N} n \cdot (G_{1p00n} \cdot \cos(n \cdot \theta) - H_{1p00n} \cdot \sin(n \cdot \theta)) \ldots + \tag{96}$$

$$\sum_{p=0}^{P} p \cdot I_1^{p-1} \cdot \sum_{q=0}^{Q} \frac{I_2^{q+1}}{q+1} \cdot \sum_{n=1}^{N} n \cdot (G_{2pq0n} \cdot \cos(n \cdot \theta) - H_{2pq0n} \cdot \sin(n \cdot \theta)) \ldots +$$

$$\sum_{p=0}^{P} p \cdot I_1^{p} \cdot \sum_{q=0}^{Q} I_2^{q} \cdot \sum_{r=0}^{R} \frac{I_3^{r+1}}{r+1} \cdot \sum_{n=1}^{N} n \cdot (G_{3pqrsn} \cdot \cos(n \cdot \theta) - H_{3pqrn} \cdot \sin(n \cdot \theta))$$

$$\frac{\partial}{\partial i_2} T = \sum_{p=0}^{P} I_1^{p} \cdot \sum_{q=0}^{Q} I_2^{q} \cdot \sum_{n=1}^{N} n \cdot (G_{2pq0n} \cdot \cos(n \cdot \theta) - H_{2pq0n} \cdot \sin(n \cdot \theta)) \ldots + \tag{97}$$

$$\sum_{p=0}^{P} I_1^{p} \cdot \sum_{q=0}^{Q} q \cdot I_2^{q-1} \cdot \sum_{r=0}^{R} \frac{I_3^{r+1}}{r+1} \cdot \sum_{n=1}^{N} n \cdot (G_{3pqrsn} \cdot \cos(n \cdot \theta) - H_{3pqrn} \cdot \sin(n \cdot \theta))$$

$$\frac{\partial}{\partial i_3} T = \sum_{p=0}^{P} I_1^{p} \cdot \sum_{q=0}^{Q} I_2^{q} \cdot \sum_{r=0}^{R} I_3^{r} \cdot \sum_{n=1}^{N} n \cdot (G_{3pqrsn} \cdot \cos(n \cdot \theta) - H_{3pqrn} \cdot \sin(n \cdot \theta)) \tag{98}$$

Hence: (99)

$$J_{11} = \sum_{p=0}^{P} I_1^{p} \cdot \sum_{n=1}^{N} n \cdot (G_{1p00n} \cdot \cos(n \cdot \theta) - H_{1p00n} \cdot \sin(n \cdot \theta)) \ldots +$$

$$\sum_{p=1}^{P} p \cdot I_1^{p-1} \cdot \sum_{q=0}^{Q} \frac{I_2^{q+1}}{q+1} \cdot \sum_{n=1}^{N} n \cdot (G_{2pq0n} \cdot \cos(n \cdot \theta) - H_{2pq0n} \cdot \sin(n \cdot \theta)) \ldots +$$

$$\sum_{p=1}^{P} p \cdot I_1^{p} \cdot \sum_{q=0}^{Q} I_2^{q} \cdot \sum_{r=0}^{R} \frac{I_3^{r+1}}{r+1} \cdot \sum_{n=1}^{N} n \cdot (G_{3pqrsn} \cdot \cos(n \cdot \theta) - H_{3pqrn} \cdot \sin(n \cdot \theta))$$

$$J_{12} = \sum_{p=0}^{P} I_1^{p} \cdot \sum_{q=0}^{Q} I_2^{q} \cdot \sum_{n=1}^{N} n \cdot (G_{2pq0n} \cdot \cos(n \cdot \theta) - H_{2pq0n} \cdot \sin(n \cdot \theta)) \ldots + \tag{100}$$

$$\sum_{p=0}^{P} I_1^{p} \cdot \sum_{q=0}^{Q} q \cdot I_2^{q-1} \cdot \sum_{r=0}^{R} \frac{I_3^{r+1}}{r+1} \cdot \sum_{n=1}^{N} n \cdot (G_{3pqrsn} \cdot \cos(n \cdot \theta) - H_{3pqrn} \cdot \sin(n \cdot \theta))$$

$$J_{13} = \sum_{p=0}^{P} I_1^{p} \cdot \sum_{q=0}^{Q} I_2^{q} \cdot \sum_{r=0}^{R} I_3^{r} \cdot \sum_{n=1}^{N} n \cdot (G_{3pqrsn} \cdot \cos(n \cdot \theta) - H_{3pqrn} \cdot \sin(n \cdot \theta)) \tag{101}$$

As stated previously in Equation (56), sensitivity with respect to angle is given by:

$$\frac{\partial}{\partial \theta} T \qquad (56)$$

From Equation (88):

$$\frac{\partial}{\partial \theta} T = \sum_{p=0}^{P} \frac{I_1^{p+1}}{p+1} \cdot \sum_{n=1}^{N} n^2 \cdot (-G_{1p00n} \cdot \sin(n \cdot \theta) - H_{1p00n} \cdot \cos(n \cdot \theta)) \ldots +$$

$$\sum_{p=0}^{P} I_1^p \cdot \sum_{q=0}^{Q} \frac{I_2^{q+1}}{q+1} \cdot \sum_{n=1}^{N} n^2 \cdot (-G_{2pq0n} \cdot \sin(n \cdot \theta) - H_{2pq0n} \cdot \cos(n \cdot \theta)) \ldots +$$

$$\sum_{p=0}^{P} I_1^p \cdot \sum_{q=0}^{Q} I_2^q \cdot \sum_{r=0}^{R} \frac{I_3^{r+1}}{r+1} \cdot \sum_{n=1}^{N} n^2 \cdot (-G_{3pqrsn} \cdot \sin(n \cdot \theta) - H_{3pqrn} \cdot \cos(n \cdot \theta)) \ldots +$$

$$\sum_{s=0}^{S} \frac{I_f^{s+1}}{s+1} \cdot \sum_{n=1}^{N} n \cdot (g_{4000sn} \cdot \sin(n \cdot \theta) - h_{4000sn} \cdot \cos(n \cdot \theta)) \qquad (102)$$

Hence, the elements of the second row of the Jacobian are given by the following expressions:

$$J_{21} = \frac{\partial}{\partial i_1} \frac{\partial}{\partial \theta} T \qquad (103)$$

$$J_{22} = \frac{\partial}{\partial i_2} \frac{\partial}{\partial \theta} T \qquad (104)$$

$$J_{23} = \frac{\partial}{\partial i_3} \frac{\partial}{\partial \theta} T \qquad (105)$$

By changing the order of the partial derivatives in Equations (103)-(105):

$$J_{21} = \frac{\partial}{\partial \theta} J_{11} \qquad (106)$$

$$J_{22} = \frac{\partial}{\partial \theta} J_{12} \qquad (107)$$

$$J_{23} = \frac{\partial}{\partial \theta} J_{13} \qquad (108)$$

Explicitly: (109)

$$J_{21} = \sum_{p=0}^{P} I_1^p \cdot \sum_{n=1}^{N} n^2 \cdot (-G_{1p00n} \cdot \sin(n \cdot \theta) - H_{1p00n} \cdot \cos(n \cdot \theta)) \ldots +$$

$$\sum_{p=0}^{P} p \cdot I_1^{p-1} \cdot \sum_{q=0}^{Q} \frac{I_2^{q+1}}{q+1} \cdot \sum_{n=1}^{N} n^2 \cdot (-G_{2pq0n} \cdot \sin(n \cdot \theta) - H_{2pq0n} \cdot \cos(n \cdot \theta)) \ldots +$$

$$\sum_{p=0}^{P} p \cdot I_1^p \cdot \sum_{q=0}^{Q} I_2^q \cdot \sum_{r=0}^{R} \frac{I_3^{r+1}}{r+1} \cdot \sum_{n=1}^{N} n^2 \cdot (-G_{3pqrsn} \cdot \sin(n \cdot \theta) - H_{3pqrn} \cdot \cos(n \cdot \theta))$$

$$J_{22} = \sum_{p=0}^{P} I_1^p \cdot \sum_{q=0}^{Q} I_2^q \cdot \sum_{n=1}^{N} n^2 \cdot (-G_{2pq0n} \cdot \sin(n \cdot \theta) - H_{2pq0n} \cdot \cos(n \cdot \theta)) \ldots + \qquad (110)$$

$$\sum_{p=0}^{P} I_1^p \cdot \sum_{q=0}^{Q} q \cdot I_2^{q-1} \cdot \sum_{r=0}^{R} \frac{I_3^{r+1}}{r+1} \cdot \sum_{n=1}^{N} n^2 \cdot (-G_{3pqrsn} \cdot \sin(n \cdot \theta) - H_{3pqrn} \cdot \cos(n \cdot \theta))$$

-continued $$J_{23} = \sum_{p=0}^{P} I_1^p \cdot \sum_{q=0}^{Q} I_2^q \cdot \sum_{r=0}^{R} I_3^r \cdot \sum_{n=1}^{N} n^2 \cdot (-G_{3pqrsn} \cdot \sin(n \cdot \theta) - H_{3pqrn} \cdot \cos(n \cdot \theta))$$ (111)

The criterion used in selecting current can be to either balance the feed or minimize the sum of squares. In the case of the least squares sum, the following is minimized:

$$I_{ss} = \sum_{k=1}^{3} i_k^2$$ (112)

A minimum is achieved when:

$$\frac{\partial}{\partial i_k} I_{ss} = 2 \cdot i_k = c$$ (113)

The third row of the Jacobian is then given by expressions of the form:

$$J_{3k} = \frac{\partial^2}{\partial i_k^2} I_{ss} = 2$$ (114)

Cogging can be included into the solver 34 in the same way as described above in conjunction with the αβ-FoR smooth torque solver.

Moreover, in a manner similar to that disclosed with the αβ-FoR smooth torque solver, the solution may be calculated across the angle intervals in a given interval simultaneously, rather than in a point by point manner. For a particular torque and sensitivity demand, the solution is to be calculated at various angles:

θ(k) for all k=1, . . . ,N

The current column vector is given by:

$I=(i_a(\theta(1))\ldots i_a(\theta(N))i_b(\theta(1))\ldots i_b(\theta(N))i_c(\theta(1))\ldots i_c(\theta(N)))^T$ (115)

If the new $I(n+1)=I(n)+\Delta(n)$ (116)

The k'th torque vector is a row vector defined by:

$\phi_{Tk}=(0 \ldots 0\ T(\theta(k),i_a(k),i_b(k),i_c(k))\ 0 \ldots 0)$

Similiarly the kth sensitivity vector is defined by:

$\phi_{Sk}=(0 \ldots 0\ S(\theta(k),i_a(k),i_b(k),i_c(k))\ 0 \ldots 0)$

Finally, the minimum sum of squares current is given by:

$\phi_{Ik}=(0 \ldots 0\ I_{ss}(i_a(k),i_b(k),i_c(k))\ 0 \ldots 0)$

These vectors can be stacked to form diagonal matrices:

$$A = \begin{pmatrix} \phi_{T1} \\ \cdots \\ \phi_{TN} \end{pmatrix} \quad B = \begin{pmatrix} \phi_{S1} \\ \cdots \\ \phi_{SN} \end{pmatrix} \quad C = \begin{pmatrix} \phi_{I1} \\ \cdots \\ \phi_{IN} \end{pmatrix}$$

Thus, appropriate partial derivatives with respect to the currents are taken and the resultant matrices aggregated to form a 3N by 3N matrix:

$$\Phi = \begin{pmatrix} \frac{\partial}{\partial i_a}A & \frac{\partial}{\partial i_b}A & \frac{\partial}{\partial i_c}A \\ \frac{\partial}{\partial i_a}A & \frac{\partial}{\partial i_b}B & \frac{\partial}{\partial i_c}C \\ \frac{\partial}{\partial i_a}A & \frac{\partial}{\partial i_b}B & \frac{\partial}{\partial i_c}C \end{pmatrix}$$ (117)

The desired torque, sensitivity and rate of change of the sum of squares at a particular angle θ(k) are given by:

T(θ(k)) S(θ(k)) I(θ(k))

The demand vector D of these values over the angle range is given by:

$$D = \begin{pmatrix} T_d(\theta(1)) \\ T_d(\theta(2)) \\ \cdots \\ T_d(\theta(N)) \\ S_d(\theta(1)) \\ S_d(\theta(2)) \\ \cdots \\ S_d(\theta(N)) \\ I(\theta(1)) \\ \cdots \\ I(\theta(N)) \end{pmatrix}$$ (118)

and the actual values of torque and sensitivity resultant from any current combination $(i_a, i_b, i_c)$ which constitute the iterated solution are given by the column vector:

$$A = \begin{pmatrix} T(\theta(1), i_a(1), i_b(1), i_c(1)) \\ T(\theta(2), i_a(2), i_b(2), i_c(2)) \\ \cdots \\ T(\theta(N), i_a(N), i_b(N), i_c(N)) \\ S(\theta(1), i_a(1), i_b(1), i_c(1)) \\ \cdots \\ S(\theta(N), i_a(N), i_b(N), i_c(N)) \end{pmatrix}$$ (119)

Using this notation and from the development initially presented:

$\Delta(n)=\Phi^{-1} \cdot (D-A)$ (120)

with:

$I(n+1)=I(n)+\Delta(n)$

Figure 4:
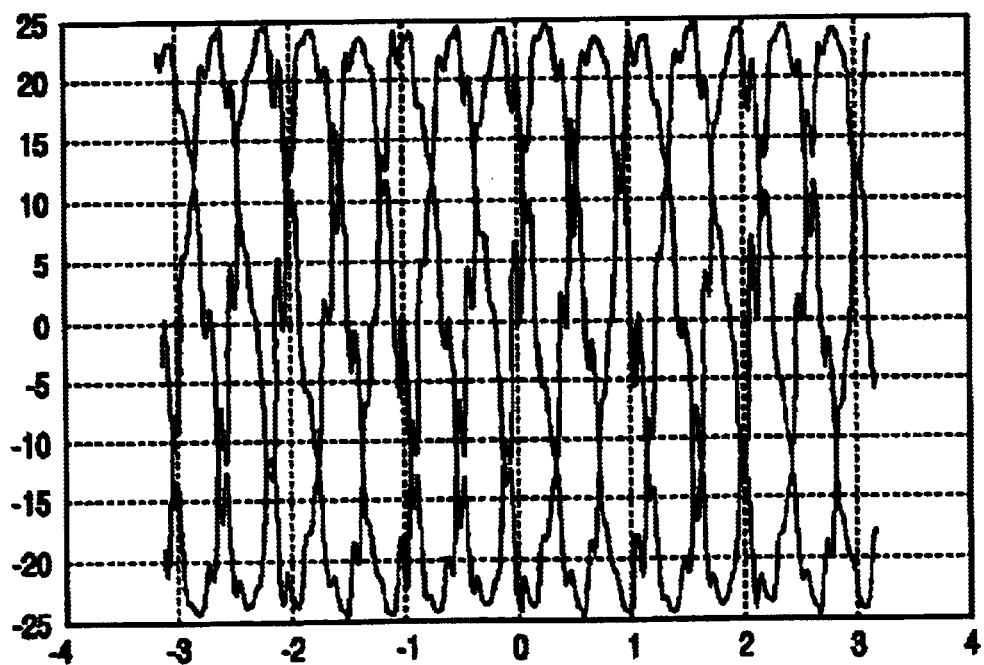
FIG. 4 illustrates current profiles generated for a smooth torque solution in accordance with the present invention.
Figure 5:
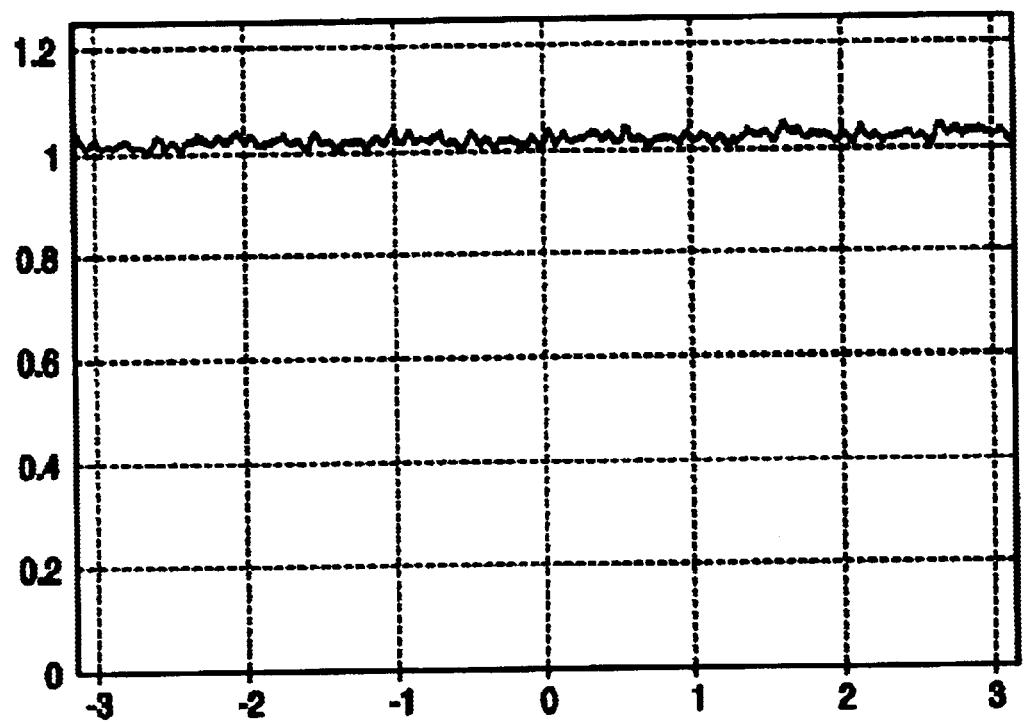
FIG. 5 illustrates torque ripple for a machine controlled in accordance with aspects of the present invention.

In one embodiment of the invention, a PM motor was used with a model fitted via the terminal variables as described herein. From this, smooth torque feeds were calculated for a variety of loads. FIG. 4 illustrates the calculated current profiles for various torques, showing three phase currents generated for a smooth torque solution. FIG.

5 shows a plot for a typical 12-10 PM motor, for which excluding noise and peaks (the plot illustrates raw data) ripple approaches 2% of the mean or 0.8% of the maximum rated torque for that motor (2.5 Nm).

It has been assumed that the individual components of the electrical model and correspondingly the torque model comprise products of polynomials and trigonometric functions. In alternative embodiments, the polynomials are replaced with true orthogonal functions. These orthogonal functions are built up from polynomials in a recursive manner. In particular polynomials of the form:

$$1, x, x^2, x^3, x^4, x^5$$

are replaced with expressions of the form:

$$\frac{1}{\sqrt{2}}, \sqrt{\frac{3}{2}} \cdot x, \sqrt{\frac{5}{8}} \cdot (3x^2 - 1), \sqrt{\frac{7}{8}} \cdot (5 \cdot x^3 - 3 \cdot x),$$

$$\frac{3}{8 \cdot \sqrt{2}} \cdot (35 \cdot x^4 + 3 - 30 \cdot x^2), \sqrt{\frac{43659}{128}} \cdot \left(x^5 - \frac{70}{63} \cdot x^3 + \frac{15}{63} \cdot x\right)$$

There are a number of sound theoretical and practical reasons why models using true orthogonal functions are to be preferred. Typically, more accurate models that have fewer terms can be derived. Such a statement is true when the order of the current terms grows beyond 2. The theoretical reason for this is well understood by those with an understanding of such mathematical structures. Succinctly, model components that are orthogonal to one another do not interact in a detrimental manner. Unnecessary model complexity is avoided and the result is that the torque estimate, achieved via the previously described transforms, are improved.

The process necessary to derive the mathematical expressions necessary is essentially the same as those described previously. For the purposes of brevity, the critical mathematical expressions and notation are presented without unnecessary repetition of the associated derivations for the balanced feed case.

Let the r'th order orthogonal function of variable x be:

$g_r(x)$

The expression for flux is then:

$$\lambda_\phi(i_\alpha, i_\beta, \theta) = \sum_{p=0}^{P} g_p(i_\alpha) \cdot$$

$$\sum_{q=0}^{Q} g_q(i_\beta) \cdot \sum_{r=0}^{R} g_r(i_f) \cdot \sum_{n=0}^{N} (a_{\phi pqrn} \cdot \sin(n \cdot \theta) + b_{\phi pqrn} \cdot \cos(n \cdot \theta))$$

The derivative of flux is given by:

$$\frac{d}{dt} \lambda_\phi = \sum_{p=0}^{P} f_p(i_\alpha) \cdot \left(\frac{d}{dt} i_\alpha\right) \cdot \sum_{q=0}^{Q} g_q(i_\beta) \sum_{r=0}^{R} g_r(i_f) \cdot \sum_{n=0}^{N} (a_{\phi pqrn} \cdot$$

$$\sin(n \cdot \theta) + b_{\phi pqrn} \cdot \cos(n \cdot \theta)) \ldots +$$

$$\sum_{p=0}^{P} g_p(i_\alpha) \cdot \sum_{q=0}^{Q} f_q(i_\beta) \cdot \left(\frac{d}{dt} i_\beta\right) \cdot \sum_{r=0}^{R} g_r(i_f) \cdot \sum_{n=0}^{N} (a_{\phi pqrn} \cdot$$

$$\sin(n \cdot \theta) + b_{\phi pqrn} \cdot \cos(n \cdot \theta)) \ldots +$$

$$\sum_{p=0}^{P} g_p(i_\alpha) \cdot \sum_{q=0}^{Q} g_q(i_\beta) \cdot \sum_{r=0}^{R} f_r(i_\beta) \cdot \left(\frac{d}{dt} i_f\right) \cdot \sum_{n=0}^{N} (a_{\phi pqrn} \cdot$$

$$\sin(n \cdot \theta) + b_{\phi pqrn} \cdot \cos(n \cdot \theta)) \ldots +$$

$$\sum_{p=0}^{P} g_p(i_\alpha) \cdot \sum_{q=0}^{Q} g_q(i_\beta) \cdot \sum_{r=0}^{R} g_r(i_f) \cdot \sum_{n=1}^{N} n \cdot \omega \cdot (a_{\phi pqrn} \cdot$$

$$\cos(n \cdot \theta) - b_{\phi pqrn} \cdot \sin(n \cdot \theta))$$

where: $\frac{d}{dx} g_p(x) = f_p(x)$

Then, the electrical equation is written:

$$\frac{v_\phi}{\omega} = \frac{R_\phi}{\omega} + \frac{i_\alpha}{\omega} \cdot R_{\phi\alpha} + \frac{i_\beta}{\omega} \cdot R_{\phi\beta} + \frac{i_\alpha \cdot i_\beta}{\omega} \cdot R_{\phi\alpha\beta} \ldots +$$

$$\left[\frac{1}{\omega} \cdot \left(\frac{d}{dt} i_\alpha\right)\right] \cdot \sum_{p=0}^{P} f_p(i_\alpha) \cdot \sum_{q=0}^{Q} g_q(i_\beta) \cdot \sum_{n=0}^{N} (A_{\phi pqrn} \cdot \sin(n \cdot \theta) + B_{\phi pqrn} \cdot \cos(n \cdot \theta)) \ldots +$$

$$\left[\frac{1}{\omega} \cdot \left(\frac{d}{dt} i_\beta\right)\right] \cdot \sum_{p=0}^{P} g_p(i_\alpha) \cdot \sum_{q=0}^{Q} f_q(i_\beta) \cdot \sum_{n=0}^{N} (A_{\phi pqrn} \cdot \sin(n \cdot \theta) + B_{\phi pqrn} \cdot \cos(n \cdot \theta)) \ldots +$$

$$\sum_{p=0}^{P} g_p(i_\alpha) \cdot \sum_{q=0}^{Q} g_q(i_\beta) \cdot \sum_{n=1}^{N} n \cdot (A_{\phi pqrn} \cdot \cos(n \cdot \theta) - B_{\phi pqrn} \cdot \sin(n \cdot \theta))$$

Coenergy is derived in a similar manner as previously resulting in:

$$\omega_c = \sum_{p=0}^{P} (h_p(I_\alpha) - h_p(0)) \cdot \sum_{q=0}^{Q} g_q(I_\beta) \cdot \sum_{n=0}^{N} \left[ \begin{array}{l} \left(A_{apqm} - \frac{1}{2} \cdot A_{bpqm} - \frac{1}{2} \cdot A_{cpqm}\right) \cdot \sin(n \cdot \theta) \ldots + \\ \left(B_{apqm} - \frac{1}{2} \cdot B_{bpqm} - \frac{1}{2} \cdot B_{cpqm}\right) \cdot \cos(n \cdot \theta) \end{array} \right] \ldots +$$

$$\sum_{p=0}^{P} g_p(0) \cdot \sum_{q=0}^{Q} (h_q(I_\beta) - h_q(0)) \cdot \sum_{n=0}^{N} \left[ \begin{array}{l} \left(\frac{-\sqrt{3}}{2} \cdot A_{bpqm} + \frac{\sqrt{3}}{2} \cdot A_{cpqm}\right) \cdot \sin(n \cdot \theta) \ldots + \\ \left(\frac{-\sqrt{3}}{2} \cdot A_{bpqm} + \frac{\sqrt{3}}{2} \cdot A_{cpqm}\right) \cdot \cos(n \cdot \theta) \end{array} \right]$$

where:

$h_p(x) = \int f_p(x) dx$

Then, torque is given by:

$$T = \sum_{p=0}^{P} (h_p(I_\alpha) - h_p(0)) \cdot \sum_{q=0}^{Q} g_q(I_\beta) \cdot \sum_{n=0}^{N} n \cdot \left[ \begin{array}{l} \left(A_{apqm} - \frac{1}{2} \cdot A_{bpqm} - \frac{1}{2} \cdot A_{cpqm}\right) \cdot \cos(n \cdot \theta) \ldots + \\ -\left(B_{apqm} - \frac{1}{2} \cdot B_{bpqm} - \frac{1}{2} \cdot B_{cpqm}\right) \cdot \sin(n \cdot \theta) \end{array} \right] \ldots +$$

$$\sum_{p=0}^{P} g_p(0) \cdot \sum_{q=0}^{Q} (h_q(I_\beta) - h_q(0)) \cdot \sum_{n=0}^{N} n \cdot \left[ \begin{array}{l} \left(\frac{-\sqrt{3}}{2} \cdot A_{bpqm} + \frac{\sqrt{3}}{2} \cdot A_{cpqm}\right) \cdot \cos(n \cdot \theta) \ldots + \\ \left(\frac{-\sqrt{3}}{2} \cdot A_{bpqm} + \frac{\sqrt{3}}{2} \cdot A_{cpqm}\right) \cdot \sin(n \cdot \theta) \end{array} \right]$$

As previously, a solver can now be defined which will calculate the necessary current values to achieve the desired solution.

One property and advantage associated with the use of model components which are truly orthonormal is that with just the most basic model present it is possible to calculate the parameters of other additional orthonormal model components in isolation from one another. That is, the model can be refined by the addition of a new orthonormal expression. The parameters for the model components estimated and the new model component can be either kept or discarded dependant upon the magnitude of the parameter associated with it.

In this manner, many different model components can be sieved in a numerically efficient and elegant manner to determine whether they should be included in the model or not. More particularly, the model fitting process can be fully automated. Starting from a very basic model (the presence of resistance terms, non-angle varying inductance) it is possible to automate the selection of model components. Starting from a basic model as described above, the electrical model is extended by selecting one or more additional "candidate" basis functions. Refiting the model results in a new set of model parameters.

Those parts of the model, or functions, with significant coefficients or parameters are kept while other parts are rejected. The test for significant a model component can be as simple as testing whether the absolute value of the coefficient is greater than some predefined percentage of the absolute value of the current biggest parameter. Such a sieving process allows for the automatic building up of a model. It is the use of orthonormal basis functions which allows for this activity, due to their minimal interaction. If the "standard" polynomials are used then the sieving process becomes confused.

The adaptive control schemes disclosed herein have several applications. For example, in accordance with certain embodiments of the invention, the control scheme is embedded into a speed control loop for use in a speed servo application. The particular embodiments disclosed above are illustrative only, as the invention may be modified and practiced in different but equivalent manners apparent to those skilled in the art having the benefit of the teachings herein. For example, the electrical model which uses a product of polynomials and trigonometric functions can be written as a product of polynomials and complex exponentials:

$$\lambda_\phi = \sum_{p=0}^{P} i_\alpha^p \cdot \sum_{q=0}^{Q} i_\beta^q \cdot \sum_{r=0}^{R} i_f^r \cdot \sum_{n=-N}^{N} e_{\phi pqm} \cdot \exp(i \cdot n \cdot \theta)$$

Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for controlling a rotating electromagnetic machine, the machine including a stator and a rotor that rotates relative to the stator, the stator including a plurality of phase windings, the method comprising:

receiving feedback regarding the rotor position relative to the stator;

receiving feedback regarding energization of the phase windings;

developing a first mathematical model based on the rotor position and energization feedback to describe electrical behavior of the machine;

developing a second mathematical model via a mathematical transform of the first mathematical model to describe torque characteristics of the machine;

receiving a torque demand signal; and calculating a phase energization current value via the second mathematical model and the torque demand signal.

2. The method of claim 1, further comprising energizing the phase windings with the calculated phase energization current value.

3. The method of claim 2, wherein the phase windings are energized with a balanced feed.

4. The method of claim 1, wherein the first mathematical model is non-linear.

5. The method of claim 3, wherein the electrical behavior described by the first mathematical model includes the relationship between voltage, current and rotor position over the predetermined operating range.

6. The method of claim 1, wherein the first mathematical model describes electrical behavior of the machine over a predetermined operating range.

7. The method of claim 1, wherein the first and second mathematical models include components that comprise products of polynomials and trigonometric functions.

8. The method of claim 1, wherein the first and second mathematical models include components that comprise orthogonal functions.

9. The method of claim 1, wherein the first mathematical model includes parameters estimated recursively.

10. The method of claim 8, wherein collected data older than a predetermined age is not used in parameter estimation.

11. The method of claim 1, further comprising generating a lookup table correlating torque demand values with the phase energization current values.

12. The method of claim 1, wherein calculating the phase energization current value includes calculating the phase energization current value in accordance with a desired machine behavior.

13. The method of claim 12, wherein the desired machine behavior includes minimizing torque ripple.

14. The method of claim 13, wherein the phase energization current is further calculated to reduce sensitivity to rotor position measurement errors.

15. The method of claim 1 further comprising updating the second mathematical model aft predetermined times.

16. The method of claim 15, wherein the predetermined times occur when the machine is not operating.

17. The method of claim 1, wherein developing the second mathematical model includes modeling the non-load dependent cogging torque.

18. The method of claim 17, wherein modeling the non-load dependent cogging torque comprises:
spinning the rotor unloaded at a predetermined angular velocity;
measuring the phase windings voltage and current:
determining the rotor positions associated with the voltage and current measurements;
developing a first mathematical model based on the measured voltage and rotor position to describe electrical behavior of the machine;
developing a second mathematical model via a mathematical transform of the first mathematical model to describe torque characteristics of the machine;
energizing the windings such that the rotor holds a predetermined position; and
calculating the cogging torque for the predetermined position via the second mathematical model.

19. A system for controlling a rotating electromagnetic machine including a stator having a plurality of phase windings, a rotor that rotates relative to the stator, and a drive connected to the phase windings for energizing the windings, the control system comprising:
an estimator connectable so the machine for receiving signals representing the phase winding voltage and rotor position; the estimator outputting parameter estimations for an electrical model of the machine based on the received voltage and rotor position;
a torque model receiving the parameter estimations from the estimator, the torque model outputting estimates of torque for associated rotor position-phase current combinations; and
a controller having input terminals for receiving a torque demand signal and the rotor position signal, the controller adapted to output a control signal to the drive in response to the torque demand and rotor position signals and the torque model.

20. The system of claim 19, wherein the estimator outputs the model parameters at predetermined times.

21. The system of claim 20, wherein the predetermined times comprise times when the rotating machine is not operational.

22. The system of claim 19, further comprising a solver coupled to the torque model and the controller, the solver calculating phase current profiles to energize the machine to achieve a predetermined machine behavior.

23. The system of claim 22, wherein the predetermined machine behavior includes minimizing torque ripple.

24. The system of claim 23, wherein the phase energization current is further calculated to reduce sensitivity to rotor position measurement errors.

25. The system of claim 22, wherein the current profiles calculated by the solver are stored in a lookup table accessible by the controller.

26. The system of claim 22, wherein the solver updates the current profiles at predetermined times.

27. A rotating electromagnetic machine system, comprising:
a stator;
a plurality of phase windings situated in the stator,
a rotor situated so as to rotate relative to the stator,
a rotor position sensor outputting a signal representing the rotor position relative to the stator,
a drive connected to the phase windings for energizing the windings;
an estimator connected to the phase windings and the rotor position sensor to receive signals representing the phase winding voltage and rotor position, the estimator outputting parameter estimations for an electrical model of the machine based on the received voltage and rotor position;
a torque model receiving the parameter estimations from the estimator, the torque model outputting estimates of torque for associated rotor position-phase current combinations; and
a controller having input terminals for receiving a torque demand signal and the rotor position signal, the controller adapted to output a control signal to the drive in response to the torque demand and rotor position signals and the torque model.

28. The system of claim 27, further comprising a solver coupled to the torque model and the controller the solver calculating phase current profiles to energize the phase windings to achieve a predetermined machine behavior.

29. The system of claim 28, wherein the current profiles calculated by the solver me stored in a lookup table accessible by the controller.

30. The system of claim 27, wherein the driver energizes the phase winding: with a balanced feed.

31. A method of determining a non-load dependent cogging torque in a permanent magnet motor having a stator, a plurality of stator windings having terminals connectable to a source of power for energizing the windings, a rotor situated to rotate relative to the stator, the method comprising:
   spinning the rotor unloaded at a predetermined angular velocity;
   measuring voltage and current at the motor terminals;
   determining the rotor positions associated with the voltage and currant measurements;
   developing a first mathematical model based on the measured voltage and rotor position to describe electrical behavior of the machine;
   developing a second mathematical model via a mathematical transform of the first mathematical model to describe torque characteristics of the machine;
   energizing the windings such that the rotor holds a predetermined position; and
   calculating the cogging torque for the predetermined position via the second mathematical model.

32. The method of claim 31, further comprising calculating the cogging torque for a plurality of predetermined positions about a complete revolution of the rotor.

33. The method of claim 31, wherein spinning the rotor unloaded comprises spinning the rotor unenergized.

34. The method of claim 31, wherein the rotor is spun at a plurality of predetermined angular velocities.

35. A system for controlling a rotating electromagnetic machine including a stator having a plurality of phase windings, a rotor that rotates relative to the stator, and a drive connected to the phase windings for energizing the windings the control system comprising:
   an estimator connectable to the machine for receiving signals representing the phase winding voltage and rotor position; the estimator outputting parameter estimations for an electrical model of the machine based on the received voltage and rotor position at predetermined times, the predetermined times including times when the rotating machine is not operational;
   a torque model receiving the parameter estimations from the estimator, the torque model outputting estimates of torque the associated rotor position-phase current combinations; and
   a controller having input terminals for receiving a torque demand signal and the rotor position signal, the controller adapted to output a control signal to the drive in response to the torque demand and rotor position signals and the torque model.

* * * * *